US012768951B2

(12) United States Patent
La et al.

(10) Patent No.: US 12,768,951 B2
(45) Date of Patent: Oct. 20, 2026

(54) COHERENT LIDAR APPARATUS INCLUDING LIGHT FREQUENCY STABILIZATION APPARATUS BASED ON COMPLEX OPLL

(71) Applicant: Lambda innoVision Inc., Hwaseong-si (KR)

(72) Inventors: Jong Pil La, Hwaseong-si (KR); Ji Eun Choi, Hwaseong-si (KR)

(73) Assignee: Lambda inno Vision Inc., Hwaseong-si (KR)

( * ) Notice: Subject to any disclaimer, the term of this patent is extended or adjusted under 35 U.S.C. 154(b) by 187 days.

(21) Appl. No.: 18/616,276

(22) Filed: Mar. 26, 2024

(65) Prior Publication Data

US 2025/0093472 A1 Mar. 20, 2025

(30) Foreign Application Priority Data

Sep. 20, 2023 (KR) ........................ 10-2023-0125317
Sep. 20, 2023 (KR) ........................ 10-2023-0125349
Nov. 20, 2023 (KR) ........................ 10-2023-0160201

(51) Int. Cl.
*G01S 7/481* (2006.01)
*G01S 7/4912* (2020.01)
(Continued)

(52) U.S. Cl.
CPC .......... *G01S 7/4815* (2013.01); *G01S 7/4917* (2013.01); *G01S 17/34* (2020.01); *G01S 17/58* (2013.01)

(58) Field of Classification Search
CPC ........ G01S 17/58; G01S 17/34; G01S 7/4917; G01S 7/4815
See application file for complete search history.

(56) References Cited

U.S. PATENT DOCUMENTS 7,986,397 B1 * 7/2011 Tiemann ................. G01S 17/32 356/5.09
2006/0203224 A1 * 9/2006 Sebastian ................ G01S 17/06 356/4.09

(Continued)

FOREIGN PATENT DOCUMENTS

JP H1076705 A 3/1998
JP 2010505095 A 2/2010

(Continued)

OTHER PUBLICATIONS

Korean Office Action of KR 10-2023-0160201 issued Feb. 2, 2024.

*Primary Examiner* — Yuqing Xiao
*Assistant Examiner* — Zhengqing Qi
(74) *Attorney, Agent, or Firm* — Dinsmore & Shohl LLP; Yongsok Choi, Esq.

(57) ABSTRACT

A LiDAR apparatus may include a first light source configured to output light for detecting a distance up to a target, a second light source configured to output light for detecting the speed of the target, a third light source configured to output light for detecting the directivity of the target moving, a light combination unit configured to combine the pieces of light radiated by the first to third light sources, an optical system configured to adjust the path or state of light to be output to the outside or reflected light reflected by the target, an interferometer configured to receive the combined light and the reflected light and to make the combined light and the reflected light interfere with each other, and a detection unit configured to detect information on the distance and speed of the target by receiving the light subjected to the interference.

5 Claims, 18 Drawing Sheets

1800

(51) Int. Cl.

| | |
|---|---|
| ***G01S 17/34*** | (2020.01) |
| ***G01S 17/58*** | (2006.01) |

(56) References Cited

U.S. PATENT DOCUMENTS

| | | | | |
|---|---|---|---|---|
| 2010/0046003 | A1 | 2/2010 | Le Floch et al. | |
| 2012/0206712 | A1 * | 8/2012 | Chang | G01S 17/87 356/28 |
| 2014/0036252 | A1 * | 2/2014 | Amzajerdian | G01S 17/875 356/28 |
| 2018/0283851 | A1 | 10/2018 | Watanabe et al. | |
| 2019/0310372 | A1 * | 10/2019 | Crouch | G01S 7/4911 |
| 2020/0400822 | A1 * | 12/2020 | Ando | G01S 17/95 |
| 2021/0373157 | A1 * | 12/2021 | Pierrottet | G01S 17/34 |
| 2022/0221557 | A1 | 7/2022 | Yeh et al. | |

FOREIGN PATENT DOCUMENTS

| | | | |
|---|---|---|---|
| KR | 1020230017129 | A | 2/2023 |
| KR | 1020230054299 | A | 4/2023 |
| WO | 2017038659 | A1 | 3/2017 |

* cited by examiner

COHERENT LIDAR APPARATUS INCLUDING LIGHT FREQUENCY STABILIZATION APPARATUS BASED ON COMPLEX OPLL

CROSS-REFERENCE TO RELATED APPLICATIONS

The present application claims priority under 35 U.S.C. § 119(a) to Korean Patent Application Nos. 10-2023-0125317 and 10-2023-0125349, filed in the Korean Intellectual Property Office on Sep. 20, 2023 and Korean Patent Application No. 10-2023-0160201, filed in the Korean Intellectual Property Office on Nov. 20, 2023, the entire disclosures of which are incorporated herein by reference.

These patents are the results of research that was carried out by the support (a unique project number: 1415187768, a detailed project number: 20024096, a project name: The development of volume 300 cc less-Solid State FMCW LiDAR for an autonomous robot for handling a poor indoor and outdoor driving environment (e.g., snow, smoke, or dust)) of the Korea Planning & Evaluation Institute of Industrial Technology by the finances of the government of the Republic of Korea (The Ministry of Trade, Industry and Energy) in 2023.

Furthermore, these patents are the results of research that was carried out by the support (a unique project number: 1425177505, a detailed project number: S3364883, a project name: the development of an ultra-small FMCW LIDAR sensor for an autonomous vehicle based on an optical semiconductor) of the Korea Technology and Information Promotion Agency by the finances of the government of the Republic of Korea (The Ministry of Small and Medium-sized Enterprises and Startups) in 2023.

BACKGROUND

1. Technical Field

The present embodiment relates to a coherent LiDAR apparatus including an optical frequency stabilization apparatus based on a complex signal OPLL.

2. Related Art

Contents described in this part merely provide background information of the present embodiment, and do not constitute a conventional technology.

Light Detection And Ranging (LiDAR) is a technology for detecting an object by using light and measuring a distance up to the object, and has been developed in a form in which topography data for constructing three-dimensional geographic information system (GIS) information are constructed and visualized and thus has been used in fields, such as construction and defense.

Recently, LiDAR has been in the spotlight as a core technology as LiDAR is applied to autonomous vehicles, mobile robots, and drones. If LiDAR is applied to an (autonomous driving) vehicle, LiDAR enables a vehicle that is being driven to measure the presence of another object or another vehicle and a distance up to another object or another vehicle.

A conventional LiDAR apparatus has detected a target by radiating a pulse and sensing reflected light that is reflected by the target. If a pulse is radiated, however, there is a difficulty in sensing a target at a long distance because it becomes difficult to sense reflected light that is reflected at the long distance. Furthermore, if the target is a human being, a LiDAR apparatus that radiates the pulse may pose a deadly threat to eye health if the pulse is incident on an eyeball. If a plurality of LiDAR apparatuses is present, there is a problem in that pieces of light that are radiated by the different apparatuses interfere with each other.

A LIDAR apparatus that has emerged due to such a problem is a frequency modulated continuous wave (FMCW) LiDAR apparatus. The FMCW LiDAR apparatus radiates, to a target, light having an oscillation frequency linearly changed over time, and senses a distance up to the target by sensing light that is reflected by the target and then incident thereon. The reflected light has a frequency having time delay depending on the distance. The FMCW LiDAR apparatus senses the location of a target by measuring a difference between the frequencies of transmitted light and received light.

A conventional FMCW LiDAR apparatus has applied mechanical scanning method using a Galvanometer and a polygon mirror scanner, has radiated light in an optical phased array way using an all-solid-state method, or has radiated light in a way using wavelength control and diffraction grating.

However, if the conventional FMCW LiDAR apparatus using the all-solid-state scan method operates in the optical phased array way, the conventional FMCW LiDAR apparatus has advantages in that high-speed scan is possible and discontinuous scan is possible, but has disadvantages in that the quality of a beam is very poor, optical transmission efficiency of a laser is very low, it is very difficult to precisely control optical phases with respect to several channels, and the price is high. Furthermore, the LiDAR apparatus that operates in the optical phased array way cannot be used as a reception channel because the LiDAR apparatus has a limited chip size and thus has very low reception efficiency. Accordingly, the applicability of the LiDAR apparatus to LiDAR in which both transmission and reception channels are required is very low.

If the conventional FMCW LiDAR apparatus operates in the way using wavelength control and diffraction grating, the oscillating wavelength of a laser can be controlled sufficiently rapidly and scanning is possible at a very high speed, and optical efficiency is excellent because a scan caliber is relatively wide. However, in order for a scan angle corresponding to one wavelength (or color) to be further widened, the wavelength needs to be controlled in a wide range. However, there is a problem in that it is very difficult to control the wavelength by using a conventional corresponding method. Furthermore, the conventional corresponding method has a problem in that it cannot be applied to LiDAR in which control is already applied to the wavelength of a laser for distance measurement, such as FMCW LiDAR, because both distance measurement and wavelength control cannot be implemented.

SUMMARY

An embodiment of the present disclosure is directed to providing an FMCW LiDAR apparatus in which multiple optical fibers are arranged in one direction so that a laser is radiated and a laser reflected by a target is condensed, which has high laser scan efficiency and can also be implemented at a low price.

An embodiment of the present disclosure is directed to providing an FMCW LiDAR apparatus which can be reduced in size and can be reduced in cost by including an analog signal generator.

Furthermore, an embodiment of the present disclosure is directed to providing an FMCW LiDAR apparatus having significantly improved performance by minimizing an influence attributable to noise.

According to an aspect of the present embodiment, there is provided an LiDAR apparatus, including a first light source configured to output light for detecting a distance up to a target, a second light source configured to output light for detecting the speed of the target, a third light source configured to output light for detecting the directivity of the target that moves, a light combination unit configured to combine the pieces of light radiated by the first to third light sources, respectively, an optical system configured to adjust the path or state of light to be output to the outside or reflected light that is reflected by the target, an interferometer configured to receive the light that has been combined by the light combination unit and the reflected light that has passed through the optical system and to make the combined light and the reflected light interfere with each other, and a detection unit configured to detect information on the distance and speed of the target by receiving the light subjected to the interference in the interferometer.

According to an aspect of the present embodiment, the light combination unit combines and adjusts the pieces of light radiated by the first light source and the second light source so that the pieces of light are output to the outside of the LiDAR apparatus.

According to an aspect of the present embodiment, the light combination unit combines and adjusts the pieces of light radiated by the first light source and the third light source so that the pieces of light proceed to the interferometer.

According to an aspect of the present embodiment, the optical system includes a transmission-optical system configured to adjust the path of the light combined by the light combination unit so that the light proceeds to the target and a reception-optical system configured to adjust the path of the reflected light that is incident thereon from the outside by being reflected by the target so that the reflected light proceeds to the interferometer.

According to an aspect of the present embodiment, the optical system amplifies light that is combined by the light combination unit and that is to be output to the target.

According to an aspect of the present embodiment, the detection unit detects the information on the distance of the target based on a frequency that has been changed by the distance of the reflected light.

According to an aspect of the present embodiment, the detection unit detects the information on the speed of the target based on a Doppler frequency.

As described above, according to an aspect of the present embodiment, it is possible to very quickly obtain a three-dimensional image of a target because high-speed scan is possible.

According to an aspect of the present embodiment, the size and price of the FMCW LiDAR apparatus can be reduced because the FMCW LiDAR apparatus includes the analog signal generator.

Furthermore, according to an aspect of the present embodiment, it is possible to significantly improve performance of the FMCW LiDAR apparatus by minimizing an influence attributable to noise.

DETAILED DESCRIPTION

Figure 1:
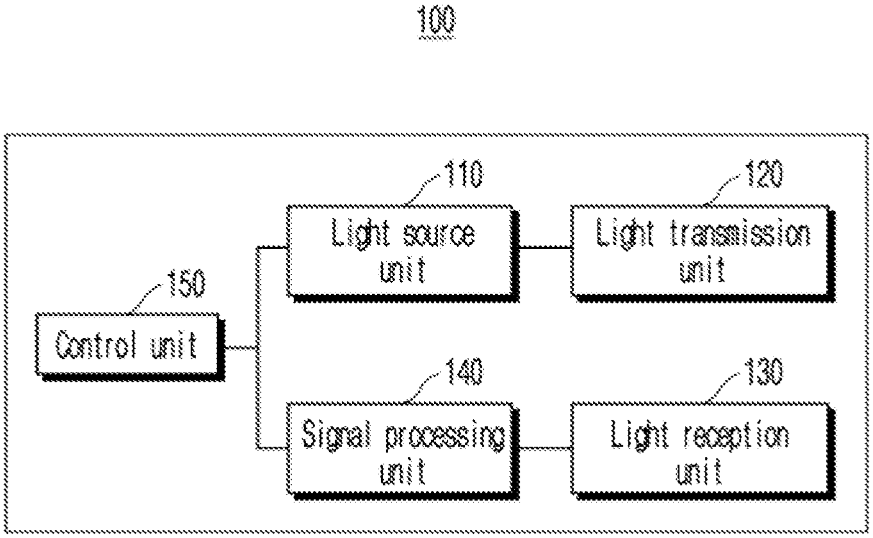
FIG. 1 is a diagram illustrating a construction of an FMCW LiDAR apparatus according to an embodiment of the present disclosure.

The present disclosure may be changed in various ways and may have various embodiments. Specific embodiments are to be illustrated in the drawings and specifically described. It should be understood that the present disclosure is not intended to be limited to the specific embodiments, but includes all of changes, equivalents and/or substitutions included in the spirit and technical range of the present disclosure. Similar reference numerals are used for similar components while each drawing is described.

Terms, such as a first, a second, A, and B, may be used to describe various components, but the components should not be restricted by the terms. The terms are used to only distinguish one component from another component. For example, a first component may be referred to as a second component without departing from the scope of rights of the present disclosure. Likewise, a second component may be referred to as a first component. The term "and/or" includes a combination of a plurality of related and described items or any one of a plurality of related and described items.

When it is described that one component is "connected" or "coupled" to the other component, it should be understood that one component may be directly connected or coupled to the other component, but a third component may exist between the two components. In contrast, when it is described that one component is "directly connected to" or "directly coupled to" the other component, it should be understood that a third component does not exist between the two components.

Terms used in this application are used to only describe specific embodiments and are not intended to restrict the present disclosure. An expression of the singular number includes an expression of the plural number unless clearly defined otherwise in the context. In this specification, a term, such as "include" or "have", is intended to designate the presence of a characteristic, a number, a step, an operation, a component, a part or a combination of them, and should be understood that it does not exclude the existence or possible addition of one or more other characteristics, numbers, steps, operations, components, parts, or combinations of them in advance.

All terms used herein, including technical terms or scientific terms, have the same meanings as those commonly understood by a person having ordinary knowledge in the art to which the present disclosure pertains, unless defined otherwise in the specification.

Terms, such as those defined in commonly used dictionaries, should be construed as having the same meanings as those in the context of a related technology, and are not construed as ideal or excessively formal meanings unless explicitly defined otherwise in the application.

Furthermore, each construction, process, procedure, or method included in each embodiment of the present disclosure may be shared within a range in which the constructions, processes, procedures, or methods do not contradict each other technically.

Figure 2:
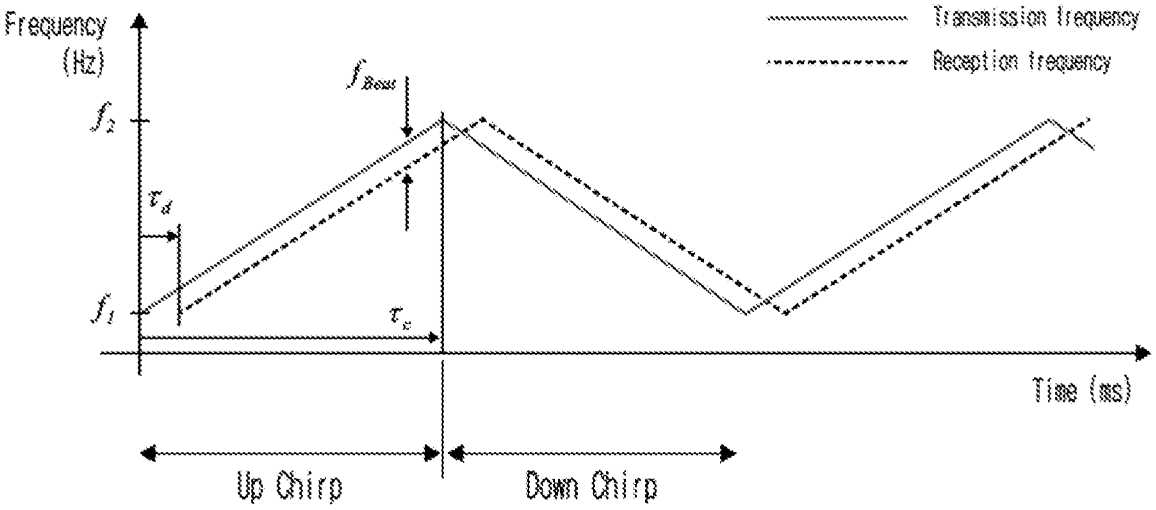
FIG. 2 is a graph illustrating the characteristics of a change in the frequency of light for each time, which is output by the FMCW LiDAR apparatus.

FIG. 1 is a diagram illustrating a construction of an FMCW LiDAR apparatus according to an embodiment of the present disclosure. FIG. 2 is a graph illustrating the characteristics of a change in the frequency of light for each time, which is output by the FMCW LiDAR apparatus.

Referring to FIG. 1, an FMCW LiDAR apparatus 100 according to an embodiment of the present disclosure includes a light source unit 110, a light transmission unit 120, a light reception unit 130, a signal processing unit 140, and a control unit 150.

The light source unit 110 outputs light for detecting a target by receiving a current, but linearly changes a frequency characteristic of the light for each time, which is output by removing phase noise from the light. As will be described with reference to FIG. 3, the light source unit 110 does not include only a light source, but further includes a stabilization unit for removing phase noise included in light that is output by the light source and adjusting the frequency characteristic of the light. Accordingly, the light source unit 110 may output light having an ideal form as much as possible.

The light having an ideal form, which is made to oscillate by the light source unit 110, has characteristics illustrated in FIG. 2.

The light that is output by the light source unit 110 has the following characteristics of a transmission frequency for each time. The frequency of the light has a characteristic in which the frequency linearly changes between a first frequency ($f_1$) and a second frequency ($f_2$) over time. In this case, a change cycle ($2\tau c$), the first frequency, and the second frequency of the light are design values. Accordingly, a frequency change slope ($\kappa$) of the oscillating light, is calculated as follows. The oscillating light may be defined as the following equation.

$$\kappa = \frac{f_2 - f_1}{\tau_c},\ f_{TX}(t) = f_1 + \kappa t$$

After the light having such a frequency characteristic for each time is output, reflected light that is reflected by the target has the same characteristic as the frequency characteristic of the output light for each time, but has a frequency characteristic in which the frequency has been delayed by a preset time ($\tau_d$) on a time axis. Accordingly, the reflected light may be defined as the following equation.

$$f_{RX}(t) = f_{TX}(t - \tau_d) = f_1 + \kappa(t - \tau_d)$$

Accordingly, the light that is output by the light source unit 110 needs to have the frequency characteristic illustrated in FIG. 2. If the light has such a frequency characteristic, the light that oscillates regardless of time and the reflected light have a frequency difference ($f_{beat}$) corresponding to a preset numerical value.

$$f_{TX}(t) - f_{RX}(t) = f_{Beat} = \kappa \times \tau_d$$

$$R = \frac{c}{2\kappa} \times f_{Beat}$$

In this case, R means a distance between the LiDAR apparatus and the target. c means the speed of the light. Since the frequency change slope and the speed of the light are known information, the LiDAR apparatus may detect a distance up to the target by detecting a difference between the frequencies of the output light and of the reflected light.

In order to satisfy the aforementioned equation, the frequency characteristic of the output light for each time, which has an ideal form, needs to linearly change. However, the light that is output by a light source within the light source unit 110 may inevitably include phase noise and a structural error.

In order to solve such a problem, the light source unit 110 includes the stabilization unit along with the light source so that the frequency characteristic of light for each time that is output by the light source linearly changes by removing phase noise and a structural error from the light. A detailed structure of the light source unit will be described later with reference to FIG. 3.

The light transmission unit 120 transmits light, which is output by the light source unit 110, to a detection area to be detected by the FMCW LiDAR apparatus 100. The light transmission unit 120 includes optical components for receiving light and dispersing or scanning the light to a detection area after adjusting the path of the light. The light transmission unit 120 receives light that is output by the light source unit 110, and transmits the light to a detection area by scanning or reflecting the light. The light transmission unit 120 may transmit the light by dispersing the light to the detection area in a lump, or may transmit the light in a form in which the light scans a corresponding area.

After the light transmission unit 120 transmits the light to the detection area, the light reception unit 130 receives reflected light that is reflected by the target. The light reception unit 130 includes optical components for receiving and focusing light or inputting reflected light to the signal processing unit 140 after adjusting the path of the light. The light reception unit 130 receives reflected light that is reflected by the detection area and transmits the reflected light to the signal processing unit 140.

The signal processing unit 140 receives the reflected light from the detection area, more specifically, the reflected light that is reflected by the target, and calculates a distance between the FMCW LiDAR apparatus 100 and the target. The distance between the FMCW LiDAR apparatus 100 and the target may be simply calculated by the aforementioned equation. Accordingly, the signal processing unit 140 calculates the distance between the FMCW LiDAR apparatus 100 and the target by detecting a difference between the frequencies of the output light and the reflected light.

The control unit 150 controls an operation of each of the components within the FMCW LiDAR apparatus 100.

Figure 3:
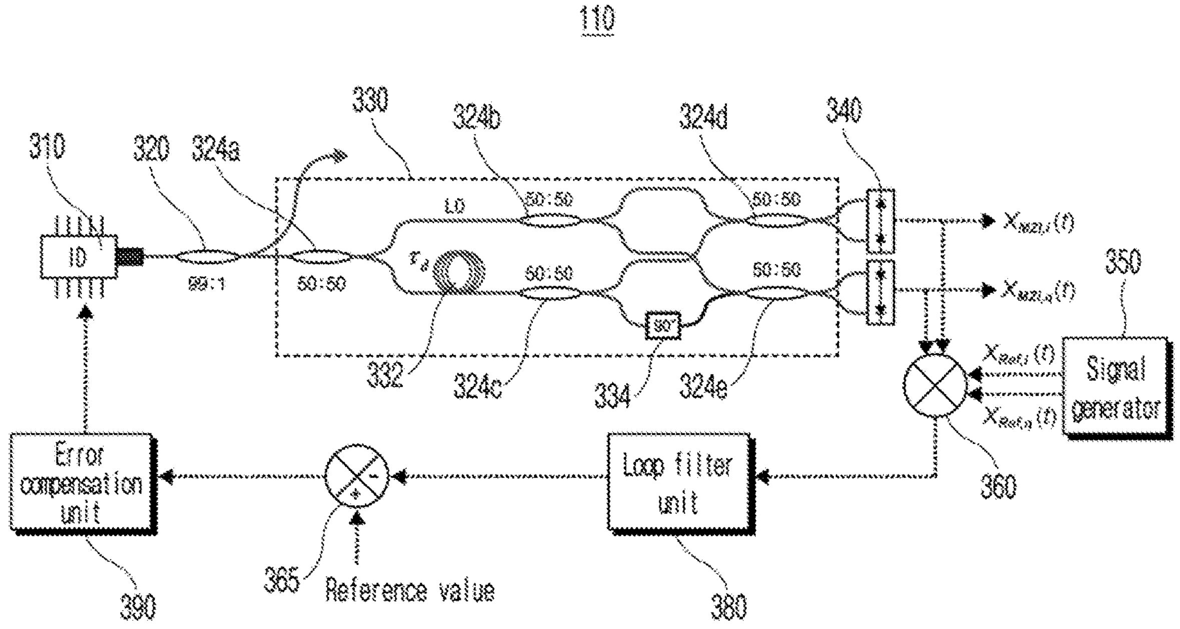
FIG. 3 is a diagram illustrating a construction of a light source unit according to an embodiment of the present disclosure.

FIG. 3 is a diagram illustrating a construction of the light source unit according to an embodiment of the present disclosure.

Referring to FIG. 3, the light source unit 110 according to an embodiment of the present disclosure includes a light source (LD) (or a light source driving circuit) 310 and a stabilization unit (not illustrated). The stabilization unit (not illustrated) includes distributors 320 and 324, an interferometer 330, a phase delayer 334, a light reception unit 340, a signal generator 350, a mixer 360, a loop filter unit 380, and an error compensation unit 390. Furthermore, the FMCW LiDAR apparatus 100 may further include a calculator 365.

The light source 310 outputs light for detecting a target by receiving a current. The light source 310 may be implemented as a single frequency laser diode (SFL) or a narrow spectral line width laser diode.

The light source 310 may output narrow band light having a long coherent length in order to maintain a coherent characteristic.

The coherent characteristic of the light means that the frequency and waveform of two pieces of light have the same state. The better the coherent characteristic, the more the interference phenomenon occurs. A coherent LiDAR apparatus can solve problems with the existing LiDAR apparatus, such as misdetection attributable to sunlight, a mutual interference problem between laser signals, or a risk to the eye. The coherent LiDAR apparatus needs to include a light source that makes narrow band light oscillate and a complex signal interferometer in order to have the aforementioned characteristic.

Figure 10A:
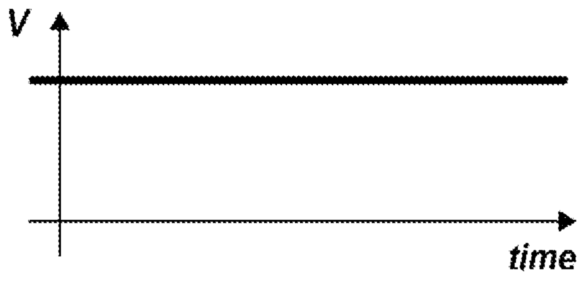
FIGS. 10A, 10B, 10C are graphs illustrating the waveforms of respective power sources that are applied to the FMCW LiDAR apparatus according to an embodiment of the present disclosure.
Figure 10B:
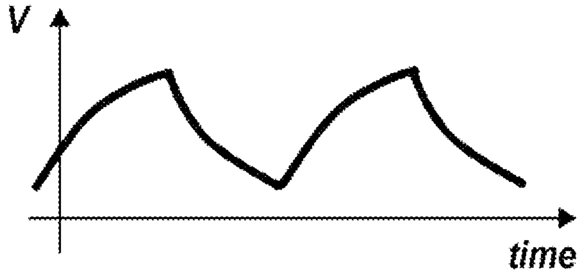
Figure 10C:
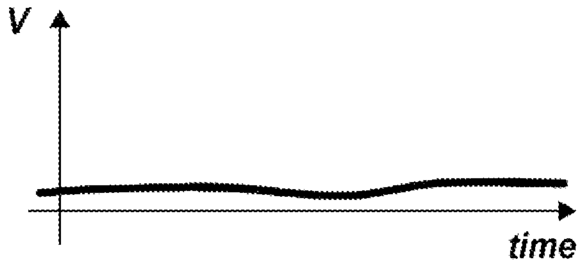
Figure 11:
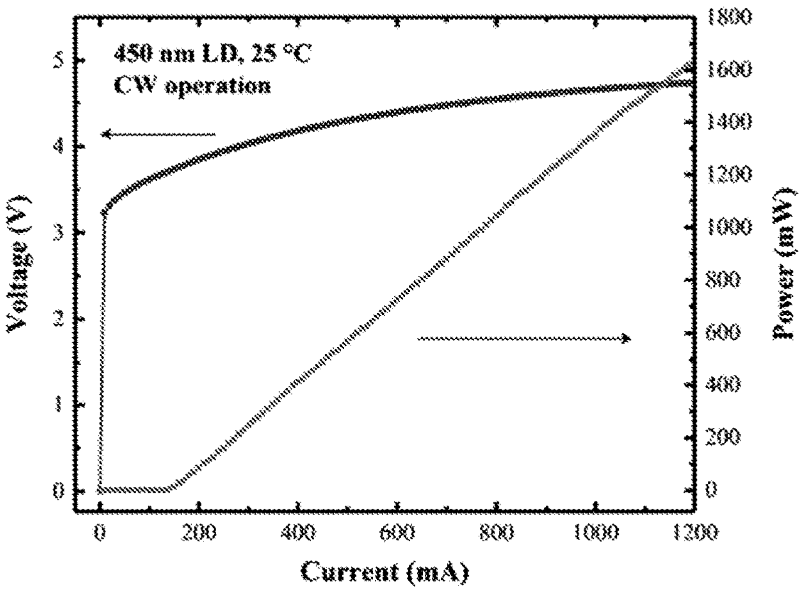
FIG. 11 is a graph illustrating relations between currents, voltages, and pieces of power of a laser diode.

Detailed structures of the light source 310 and a driving circuit thereof will be described later with reference to FIGS. 9 to 11.

The light source 310 outputs light, but the light that is output by the light source 310 inevitably includes phase noise and a structural error. Accordingly, the stabilization unit (not illustrated) removes the phase noise and the structural error so that the frequency characteristic of the light for each time, which is output by the light source 310, linearly changes.

The distributor 320 distributes light that is output by the light source 310 into light for an operation (i.e., detecting a target) of the FMCW LiDAR apparatus 100 and light for frequency modulation linearization. The distributor 320 may distribute the light for the operation of the LiDAR apparatus at a preset ratio, for example, 90% or more compared to the light for the frequency modulation linearization. The light that has been distributed by the distributor 320 may be branched into a separate component (not illustrated) for detection within the LiDAR apparatus and radiated to the outside.

The light for the frequency modulation linearization, which has been branched from the distributor 320, is applied to the interferometer 330. The interferometer 330 performs time delay or phase delay on the applied light, and makes light that has not been delayed and light that has been subjected to time delay and/phase delay interfere with each other.

The distributor **324*a* distributes the light, which is applied to the interferometer 330, into two pieces of light at a ratio of 50:50. Any one of the two pieces of light distributed by the distributor 324*a* is applied to the distributor 324*b* without separate delay. In contrast, the other of the two pieces of light distributed by the distributor 324*a* is delayed through an optical fiber delay line 332 by a preset time ($\tau_d$) and then applied to the distributor 324*c*. The light that has been delayed by the preset time ($\tau_d$) through the optical fiber delay line 332** may be light corresponding to reflected light that is reflected by a target at a predetermined distance and that is delayed by a preset time in a processing process for frequency modulation linearization.

The light that has not been subjected to time delay and the light that has been subjected to time delay, through the distributor **324*a*, are incident on the distributors 324*b* and 324*c*, respectively, each of which branches light applied thereto into two pieces of light at a ratio of 50:50. Light that has not been subjected to time delay through each of the distributors 324*b* and 324*c* is branched into two pieces of light A and B. Light that has been subjected to time delay through each of the distributors 324*b* and 324*c* is branched into two pieces of light C and D. In this case, the phase of any one of the two pieces of light that have been branched and subjected to time delay through the distributor 324*c* is delayed by 90° through the phase delayer 334. That is, the light that is incident on the interferometer 330 is distributed as the two pieces of light A and B that have not been subjected to time delay, the one piece of light C that has been subjected to time delay, but has not been subjected to phase delay, and the one piece of light D that has been subjected to both time delay and phase delay. One of the two piece of light (i.e., any one of the two pieces of light A and B) that have not been subjected to time delay and the light C that has been subjected to time delay, but has not been subjected to phase delay are incident on the distributor 324***d*, and interfere with each other. The other of the two piece of light (i.e., the other of the two pieces of light A and B) that have not been subjected to time delay and the light D that has been subjected to both time delay and phase delay are incident on the distributor 324*e*, and interfere with each other.

The two pieces of light that are made to interfere with each other in the interferometer 330 appear as follows.

$$x_{MZI,i}(t) = \cos(\kappa\tau_d t + \phi_N(t))$$

$$x_{MZI,q}(t) = \sin(\kappa\tau_d t + \phi_N(t))$$

In this case, $x_{MZI,i}(t)$ (hereinafter denoted as "first interference light") means interference light of one piece of light that has not been subjected to time delay and light that has been subjected to time delay and that has not been subjected to phase delay. $x_{MZI,q}(t)$ (hereinafter denoted as "second interference light") means interference light of one piece of light that has not been subjected to time delay and light that has been subjected to both time delay and phase delay. I means amplitude of the interference light. $\varphi_N(t)$ means phase noise that has occurred.

The light reception unit 340 senses the first interference light and the second interference light as a first interference signal (i.e., a current signal) and a second interference signal (i.e., a current signal), respectively.

The signal generator 350 generates the first interference light ($x_{Ref,i}(t)$) and the second interference light ($x_{Ref,q}(t)$), which are ideal when phase noise does not occur, as current signals (hereinafter denoted as a "first reference signal" and a "second reference signal"). The first reference signal and the second reference signal that are generated by the signal generator 350 appear as follows, and have a characteristic illustrated in FIG. 5.

$$x_{Ref,i}(t) = \cos(\kappa\tau_d t)$$

$$x_{Ref,q}(t) = \sin(\kappa\tau_d t)$$

Figure 5:
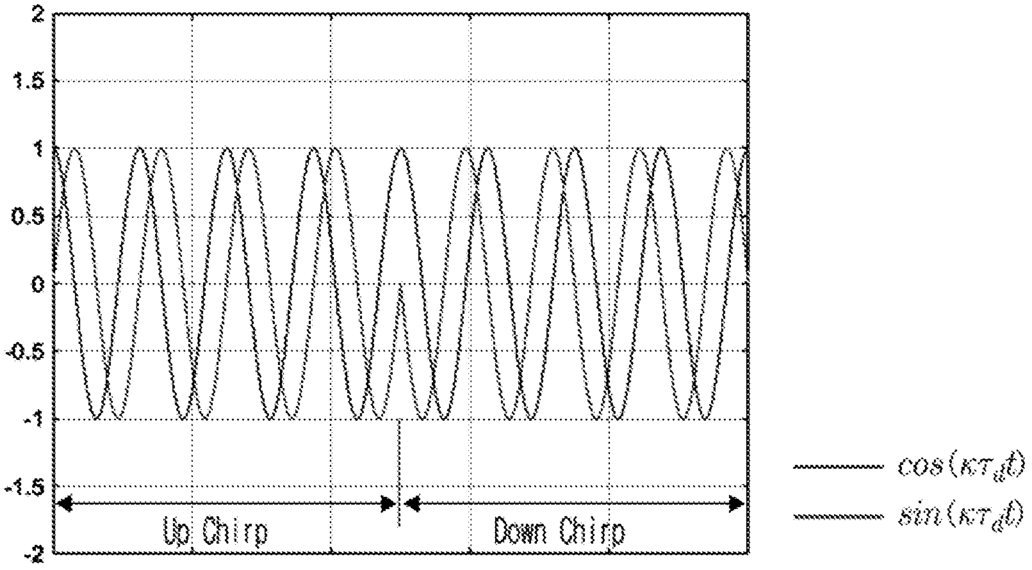
FIG. 5 is a graph illustrating the characteristics of a signal that needs to be generated by a signal generator within the FMCW LiDAR apparatus.

FIG. 5 is a graph illustrating the characteristics of a signal that needs to be generated by the signal generator within the FMCW LiDAR apparatus.

Referring to FIG. 5, the first reference signal and the second reference signal each have an up-chirp interval and a down-chirp interval like the first interference signal and the second interference signal. In the up-chirp interval, the phase of any one of the first reference signal and the second reference signal is ahead of the phase of the other thereof. In the down-chirp interval, the phase of the other of the first reference signal and the second reference signal is ahead of the phase of one thereof. The signal generator 350 has the construction of FIG. 5 to be described later, and thus may generate the first reference signal and the second reference signal in an analog way and also fully implement even the up-chirp interval and the down-chirp interval.

Referring back to FIG. 3, the mixer 360 receives a first reference signal and a second reference signal from the light reception unit 340 and receives the first interference signal and the second interference signal from the signal generator 350, and mixes the received signals. The mixer 360 may perform a plurality of analog multiplications and one or more difference calculation operations. The mixer 360 mixes the aforementioned signals as follows.

$$\begin{aligned} x_{Mix(t)} &\equiv x_{MZI,q(t)} \otimes x_{Ref,i(t)} \ominus x_{MZI,i(t)} \otimes x_{Ref,q(t)} \\ &= \sin(\kappa\tau_d t + \phi_N(t)) \times \cos(\kappa\tau_d t) + \cos(\kappa\tau_d t + \phi_N(t)) \times \sin(\kappa\tau_d t) \\ &= \sin(\kappa\tau_d t + \phi_N(t) - \kappa\tau_d t) \\ &= \sin(\phi_N(t)) \end{aligned}$$

Alternatively, the mixer 360 mixes the aforementioned signals as follows.

$$\begin{aligned} x_{Mix(t)} &\equiv x_{MZI,i(t)} \otimes x_{REf,i(t)} \oplus x_{MZI,q(t)} \otimes x_{REf,q(t)} \\ &= \cos(\kappa\tau_d t + \phi_N(t)) \times \cos(\kappa\tau_d t) + \sin(\kappa\tau_d t + \phi_N(t)) \times \sin(\kappa\tau_d t) \\ &= \cos(\kappa\tau_d t + \phi_N(t) - \kappa\tau_d t) \\ &= \cos(\phi_N(t)) \end{aligned}$$

Through the mixing of the mixer 360, only a phase noise signal is output by the mixer 360.

The loop filter unit 380 receives the signal that has been mixed by the mixer 360, and filters out other noise from the signal. The loop filter unit 380 may be implemented as a loop filter, and may filter out other noise.

The error compensation unit 390 converts the phase noise signal that has passed through the loop filter unit 380 into a current signal, and applies, to the light source 310, a current having an error compensated for. Since a light signal that is output by the light source 310 is proportional to the current that is applied to the light source 310 for an operation, the error compensation unit 390 compensates for the phase noise signal with respect to the current that is applied to the light source 310. The error compensation unit 390 may be implemented as a current driver (not illustrated).

The error compensation unit 390 applies, to the light source 310, a current having a frequency noise value compensated for. Accordingly, the light (having the characteristics of a change in the frequency of light for each time) that has been described with reference to FIG. 2 may oscillate from the light source 310.

Furthermore, the FMCW LiDAR apparatus 100 may further include the calculator 365. A phase noise signal that is output by the mixer 360 has a sinusoidal form. However, in order for the error compensation unit 390 to perform error compensation more smoothly, it is preferred that the phase noise signal has a triangular wave form (similar to a form of the frequency of a signal that is output by the light source). Furthermore, in order for the error compensation unit 390 to perform error compensation more exactly, it is preferred that the waveform of the phase noise signal is disposed within an interval in which the waveform of the phase noise signal linearly changes, such as a $-\pi/2$ to $\pi/2$ interval when the phase noise signal has a sine waveform.

To this end, the FMCW LiDAR apparatus 100 includes the calculator 365. A signal that has passed through the loop filter unit 380 and a triangular waveform signal (i.e., a reference signal) are applied to the calculator 365. The calculator 365 receives and mixes the signal and the triangular waveform signal, and outputs a phase noise signal having a sinusoidal form, which has passed through the loop filter unit 380, as a triangular waveform signal. In this case, if the triangular waveform signal having a complete form is applied to the calculator 365 as a reference signal, the output phase noise signal has a triangular waveform, but may have a waveform having a partially distorted form. Accordingly, the triangular waveform signal that is applied to the calculator 365 as the reference signal may be a partially distorted waveform. As such a reference signal is applied to the calculator 365, a phase noise triangular waveform signal having a complete form may be output. The calculator 365 outputs the corresponding signal to the error compensation unit 390.

Figure 4:
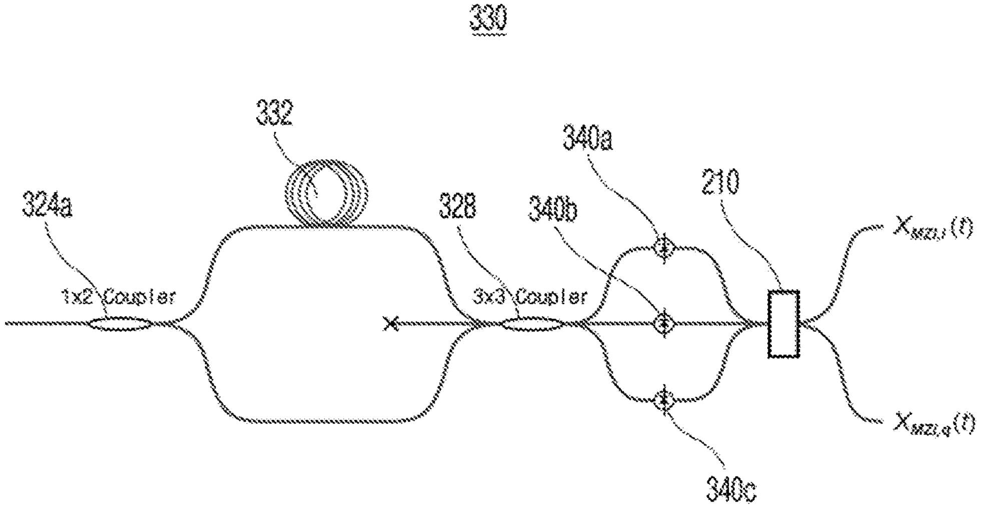
FIG. 4 is a diagram illustrating a construction of an interferometer for measuring a phase error of the light source unit according to another embodiment of the present disclosure.

FIG. 4 is a diagram illustrating a construction of the interferometer for measuring a phase error of the light source unit according to another embodiment of the present disclosure.

The interferometer 330 according to an embodiment of the present disclosure may be implemented as illustrated in FIG. 4.

The distributor 324*a* branches light that is applied to the interferometer 330 into two pieces of light at a ratio of 50:50. Any one of the two pieces of light distributed by the distributor 324*a* is applied to the distributor 328 without separate delay. In contrast, the other of the two pieces of light distributed by the distributor 324*a* is delayed through the optical fiber delay line 332 by a preset time ($\tau_d$) and then applied to the distributor 328.

The distributor 328 receives a light signal that has been subjected to time delay and a light signal that has not been subjected to time delay after the light has been distributed by the distributor 324*a*, and makes the received light signals interfere with each other as three signals.

First to third light reception units 340*a*, 340*b*, and 340*c* receive the three interference signals, respectively, which have been distributed after interfering with each other in the distributor 328. The interference signals that have interfered with each other in the light reception units 340*a*, 340*b*, and 340*c*, respectively, are as follows.

$$I_1 = I\cdot\cos\left(\kappa\tau_d t + \phi_N(t) + \frac{2\pi}{3}\right)$$

$$I_2 = I\cdot\cos(\kappa\tau_d t + \phi_N(t))$$

$$I_3 = I\cdot\cos\left(\kappa\tau_d t + \phi_N(t) - \frac{2\pi}{3}\right)$$

A complex signal generation unit 210 generates a first interference signal and a second interference signal by receiving the interference signals distributed by the distributor 328. The complex signal generation unit 210 generates the first interference signal and the second interference signal by subtracting or amplifying the two interference signals as follows.

$$x_{MZI,i}(t) = I_2 - \frac{1}{2}I_1 - \frac{1}{2}I_3$$

$$x_{MZI,q}(t) = \frac{\sqrt{3}}{2}(I_3 - I_1)$$

The interferometer 330 is implemented as illustrated in FIG. 4, and may make pieces of light applied thereto interfere with each other so that the first interference signal and the second interference signal are generated.

Figure 6:
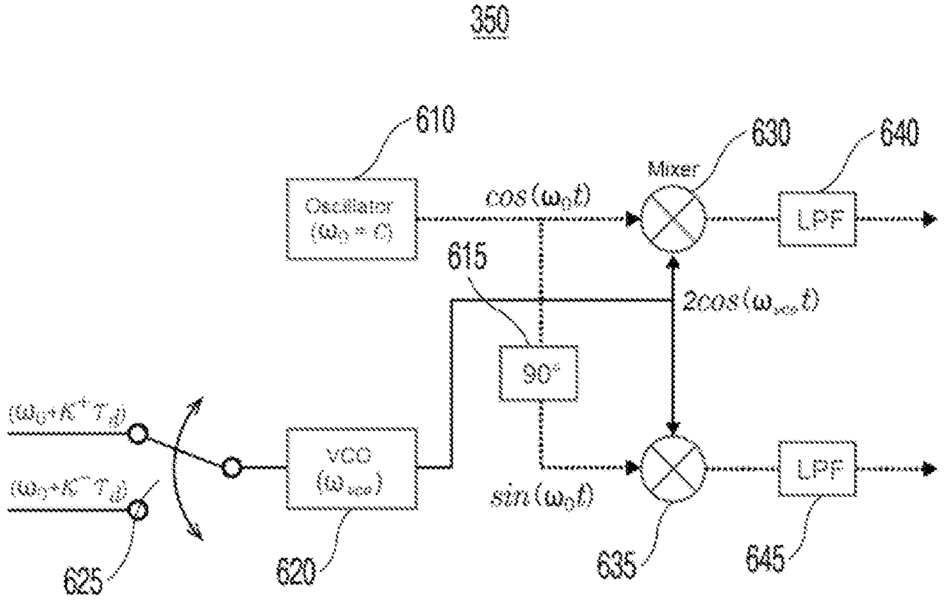
FIG. 6 is a diagram illustrating a construction of the signal generator within the FMCW LiDAR apparatus according to an embodiment of the present disclosure.
Figure 7:
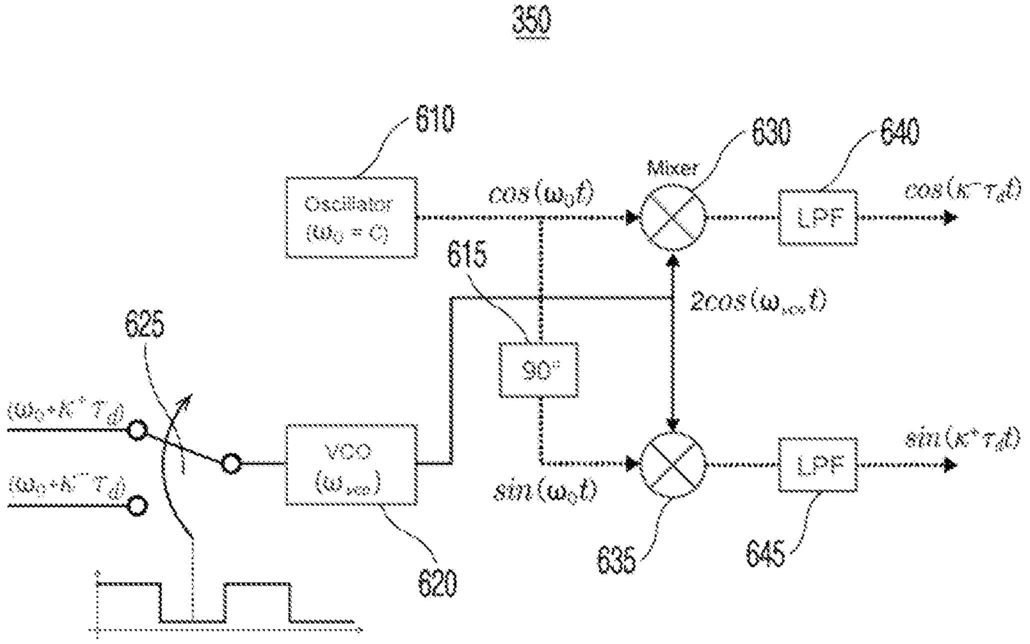
FIGS. 7 and 8A are diagrams illustrating a form in which the signal generator within the FMCW LiDAR apparatus according to an embodiment of the present disclosure operates.
Figure 8A:
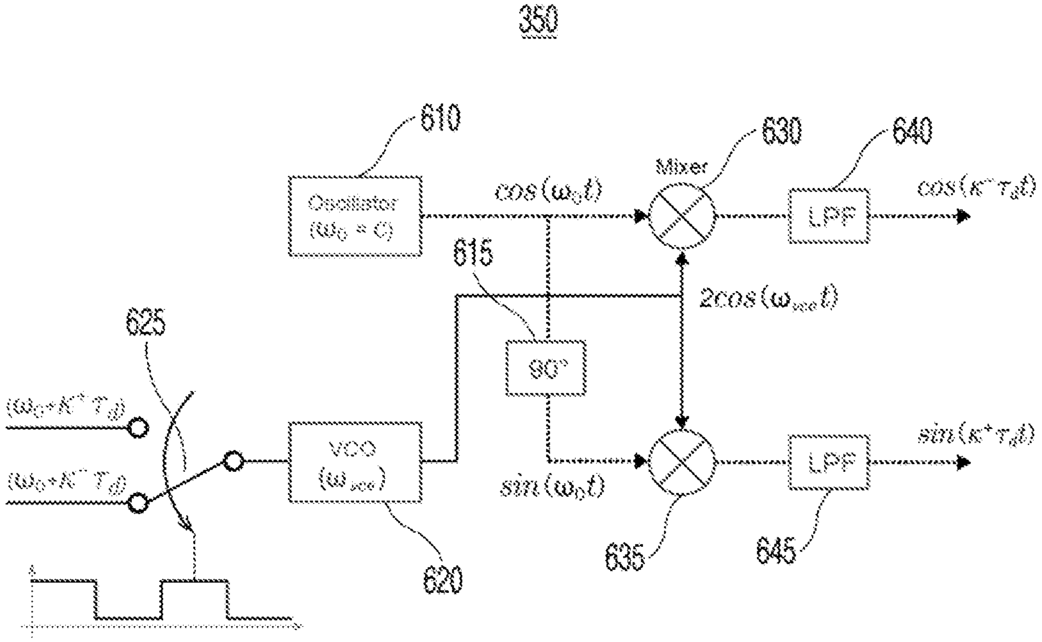

FIG. 6 is a diagram illustrating a construction of the signal generator within the FMCW LiDAR apparatus according to an embodiment of the present disclosure. FIGS. 7 and 8A are diagrams illustrating a form in which the signal generator within the FMCW LiDAR apparatus according to an embodiment of the present disclosure operates.

Referring to FIG. 6, the signal generator 350 according to an embodiment of the present disclosure includes an oscillator 610, a phase delayer 615, a voltage-controlled oscillator (VCO) 620, a switch 625, mixers 630 and 635 and the low pass filters (LPFs) 640 and 645.

The oscillator 610 generates a sine wave having a preset (or arbitrary) frequency ($\omega_0$). The oscillator 610 generates a sine wave having a preset frequency, for example, a cosine signal, and applies the cosine signal to the phase delayer 615 and the mixer 630.

The phase delayer 615 delays the phase of the cosine signal, which is applied by the oscillator 610, by 90°. Accordingly, when the cosine signal is generated by the oscillator 610, the cosine signal is output as a sine signal through the phase delayer 615. The phase delayer 615 applies, to the mixer 635, the sine signal by delaying the phase of the sine signal applied thereto.

The VCO 620 generates a sine wave that has a frequency corresponding to the size of a voltage based on the voltage applied thereto. As the switch 625 operates, the size of the voltage that is applied to the VCO 620 becomes different. As the switch 625 operates, the voltage that is applied to the VCO 620 has a size that makes the frequency of the sine wave generated by the VCO 620 have a first frequency or a second frequency. In this case, the first frequency may be a frequency, that is, the sum of a preset frequency ($\omega_0$) and a difference ($\kappa^+\tau_d$) between the frequencies of light that is output in the up-chirp interval and reflected light thereof. The second frequency may be a frequency, that is, the sum of the preset frequency ($\omega_0$) and a difference ($\kappa^-\tau_d$) between the frequencies of light that is output in the down-chirp interval and reflected light thereof. As the switch 625 operates, the VCO 620 generates a sine wave (i.e., a cosine signal) having the first frequency or a sine wave (i.e., a cosine signal) having the second frequency by receiving voltages having different sizes. The VCO 620 applies the sine wave to the mixers 630 and 635.

The switch 625 changes the size of the voltage that is applied to the VCO 620 so that the VCO 620 may generate the sine wave having the first frequency or the sine wave having the second frequency. The switch 625 selectively applies, to the VCO 620, any one of a voltage that enable the VCO 620 to output the sine wave having the first frequency and a voltage that enable the VCO 620 to output the sine wave having the second frequency. Accordingly, although the signal generator 350 is implemented by only analog components, the signal generator 350 may generate the first and second reference signals that are intact, and may divisively generate even reference signals in the up-chirp interval and the down-chirp interval.

The mixer 630 mixes the sine wave generated by the oscillator 610 and the sine wave generated by the VCO 620.

As illustrated in FIG. 7, when the mixer 630 receives the sine wave having the first frequency, which has been generated by the VCO 620, along with the sine wave generated by the oscillator 610, the mixer 630 mixes the signals as follows.

$$\begin{aligned}&= 2\cos(\omega_{vco}t)\cos(\omega_0 t)\\&= 2\cos(\omega_0 t + \kappa^+\tau_d t)\cos(\omega_0 t)\\&= \cos(\omega_0 t + \kappa^+\tau_d t + \omega_0 t) + \cos(\omega_0 t + \kappa^+\tau_d t - \omega_0 t)\\&= \cos(2\omega_0 t + \kappa^+\tau_d t) + \cos(\kappa^+\tau_d t)\end{aligned}$$

As illustrated in FIG. 8, when the mixer 630 receives the sine wave having the second frequency, which has been generated by the VCO 620, along with the sine wave generated by the oscillator 610, the mixer 630 mixes the signals as follows.

$$\begin{aligned}&= 2\cos(\omega_{vco}t)\cos(\omega_0 t)\\&= 2\cos(\omega_0 t + \kappa^-\tau_d t)\cos(\omega_0 t)\\&= \cos(\omega_0 t + \kappa^-\tau_d t + \omega_0 t) + \cos(\omega_0 t + \kappa^-\tau_d t - \omega_0 t)\\&= \cos(2\omega_0 t + \kappa^-\tau_d t) + \cos(\kappa^-\tau_d t)\end{aligned}$$

The mixer 635 mixes the sine wave that has passed through the phase delayer 615 and the sine wave that has been generated by the VCO 620.

As illustrated in FIG. 7, when the mixer 635 receives the sine wave having the first frequency, which has been generated by the VCO 620, along with the sine wave that has passed through the phase delayer 615, the mixer 630 mixes the signals as follows.

$$\begin{aligned}&= 2\cos(\omega_{vco}t)\sin(\omega_0 t)\\&= 2\cos(\omega_0 t + \kappa^+\tau_d t)\sin(\omega_0 t)\\&= \cos(\omega_0 t + \kappa^+\tau_d t + \omega_0 t) - \sin(\omega_0 t + \kappa^+\tau_d t - \omega_0 t)\\&= \cos(2\omega_0 t + \kappa^+\tau_d t) - \sin(\kappa^+\tau_d t)\end{aligned}$$

As illustrated in FIG. 8, when the mixer 630 receives the sine wave having the second frequency, which has been generated by the VCO 620, along with the sine wave generated by the oscillator 610, the mixer 630 mixes the signals as follows.

$$\begin{aligned}&= 2\cos(\omega_{vco}t)\sin(\omega_0 t)\\&= 2\cos(\omega_0 t + \kappa^-\tau_d t)\sin(\omega_0 t)\\&= \cos(\omega_0 t + \kappa^-\tau_d t + \omega_0 t) - \sin(\omega_0 t + \kappa^-\tau_d t - \omega_0 t)\\&= \cos(2\omega_0 t + \kappa^-\tau_d t) - \sin(\kappa^-\tau_d t)\end{aligned}$$

The mixers 630 and 635 mix the signals, respectively, as described above, and apply the mixed signals to the LPFs 640 and 645, respectively.

Each of the LPFs 640 and 645 filters out components other than the first and second reference signals from the signal applied thereto.

As illustrated in FIG. 7, when the signals are applied to the LPFs 640 and 645, respectively, each LPF performs the filtering as follows.

$$\begin{aligned}LPF(640) &= \cos(2\omega_0 t + \kappa^+\tau_d t) + \cos(\kappa^+\tau_d t)\\&= \cos(\kappa^+\tau_d t)\\&= \cos(-\kappa^+\tau_d t)\\&= \cos(\kappa^-\tau_d t)(\because \kappa^+ = -\kappa^-)\\LPF(645) &= \cos(2\omega_0 t + \kappa^+\tau_d t) - \sin(\kappa^+\tau_d t)\\&= -\sin(\kappa^+\tau_d t)\\&= \sin(-\kappa^+\tau_d t)\\&= \sin(\kappa^-\tau_d t)\end{aligned}$$

Accordingly, in the up-chirp interval, the signal generator 350 may output the aforementioned signal.

In contrast, as illustrated in FIG. 8, when the signals are applied to the LPFs 640 and 645, respectively, each LPF performs the filtering as follows.

$$\begin{aligned}LPF(640) &= \cos(2\omega_0 t + \kappa^-\tau_d t) + \cos(\kappa^-\tau_d t)\\&= \cos(\kappa^-\tau_d t)\\&= \cos(-\kappa^-\tau_d t)\\&= \cos(\kappa^+\tau_d t)\\LPF(645) &= \cos(2\omega_0 t + \kappa^-\tau_d t) - \sin(\kappa^-\tau_d t)\\&= -\sin(\kappa^-\tau_d t)\\&= \sin(-\kappa^-\tau_d t)\\&= \sin(\kappa^+\tau_d t)\end{aligned}$$

Accordingly, in the down-chirp interval, the signal generator 350 may output the aforementioned signal.

That is, although the signal generator 350 includes only analog components, the signal generator 350 may generate the first and second reference signals that are intact. In particular, in generating the first and second reference signals, the signal generator 350 may wholly generate the first and second reference signals that are suitable for each of the up-chirp interval and the down-chirp interval, by dividing the up-chirp interval and the down-chirp interval.

Figure 8B:
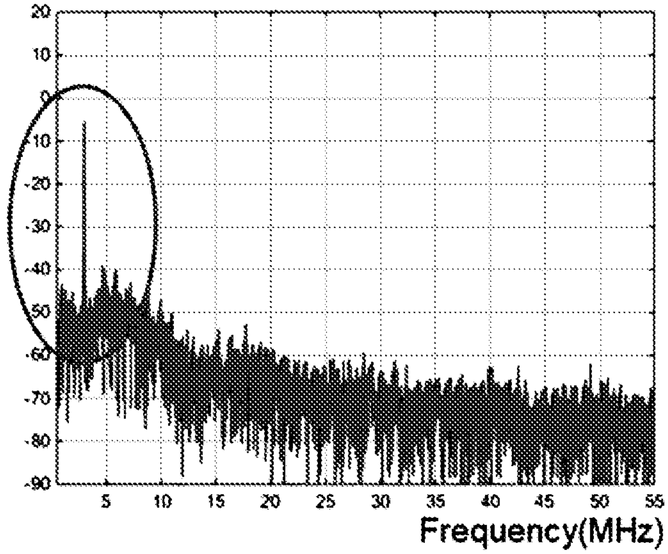
FIGS. 8B and 8C illustrate frequency spectra of the FMCW LiDAR apparatus according to a distance to a target according to an embodiment of the present disclosure.
Figure 8C:
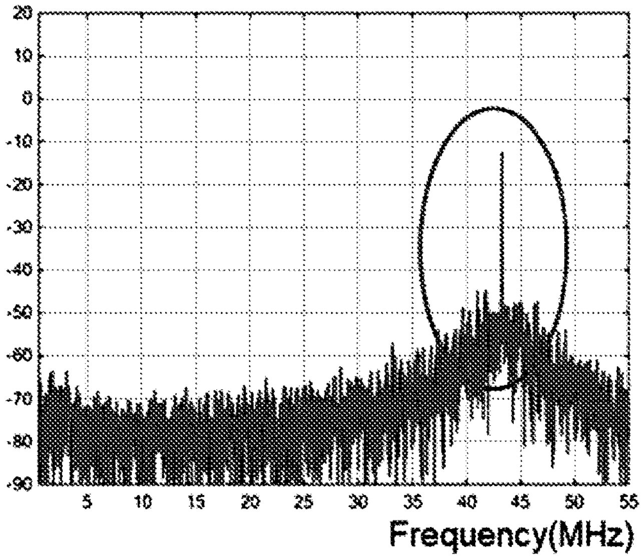

FIGS. 8B and 8C illustrate frequency spectra of the FMCW LiDAR apparatus according to a distance to a target according to an embodiment of the present disclosure.

The FMCW LiDAR apparatus 100 can obtain a relatively high signal to noise ratio although a target is disposed at a long distance as illustrated in FIG. 8C in addition to a case in which a target is disposed at a short distance as illustrated in FIG. 8B. Accordingly, the FMCW LiDAR apparatus 100 can obtain a sharp bit frequency when performing frequency signal processing by FFT.

Figure 9:
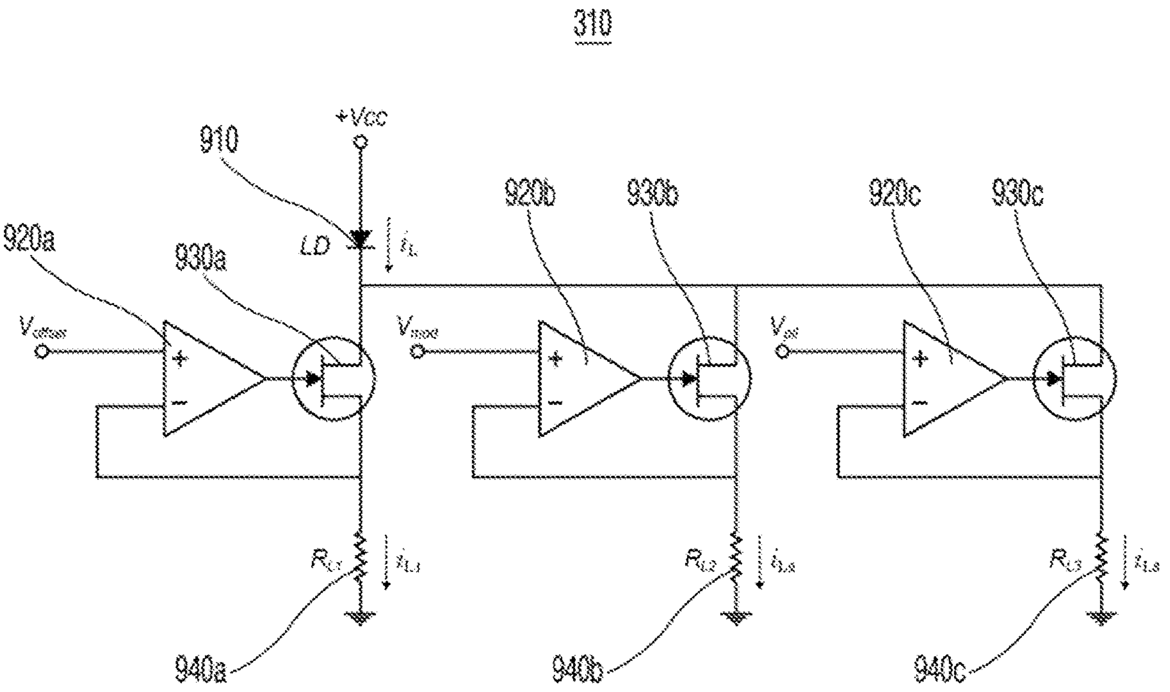
FIG. 9 is a circuit diagram illustrating a construction of a light source driving circuit within the FMCW LiDAR apparatus according to an embodiment of the present disclosure.

FIG. 9 is a circuit diagram illustrating a construction of the light source driving circuit within the FMCW LiDAR apparatus according to an embodiment of the present disclosure. FIGS. 10A, 10B, 10C are graphs illustrating the waveforms of respective power sources that are applied to the FMCW LiDAR apparatus according to an embodiment of the present disclosure. FIG. 11 is a graph illustrating relations between currents, voltages, and pieces of power of a laser diode.

Referring to FIG. 9, the light source driving circuit 310 of the FMCW LiDAR apparatus according to an embodiment of the present disclosure includes a laser diode 910, a plurality of amplifiers 920 (920*a* to 920*n*), a plurality of switches 930 (930*a* to 930*n*), and a plurality of load resistors 940 (940*a* to 940*n*).

The laser diode 910 is a device for making light oscillate. When a current having a threshold value or more flows as illustrated in FIG. 11, the intensity (or power) of an oscillating laser has a characteristic in which the intensity (or power) is proportional to a driving current.

As illustrated in FIGS. 10A, 10B, 10C, a voltage that is input to the light source driving circuit 310 within the FMCW LiDAR apparatus includes an offset voltage ($V_{offset}$, FIG. 10A), a voltage ($V_{mod}$, FIG. 10B) for frequency modulation, and a PLL compensation voltage ($V_{pll}$, FIG. 10C) for compensating for phase noise. In this case, the size of the offset voltage ($V_{offset}$) is relatively very great compared to the voltage ($V_{mod}$) and the PLL compensation voltage ($V_{pll}$). Accordingly, there is a problem because the light source and the driving driver within the conventional FMCW LiDAR apparatus process power having different sizes by using the same load resistor. Accordingly, the light source driving circuit 310 includes the plurality of amplifiers 920*a* to 920*n*, the plurality of switches 930*a* to 930*n*, and the plurality of load resistors 940*a* to 940*n*.

The laser diode 910 makes light oscillate with the intensity proportional to a current ($i_L$) that flows into the light source driving circuit 310.

The amplifiers 920 receive different voltages that are input to the light source driving circuit 310, transmit the voltages to the load resistors 940, respectively, and simultaneously output output signals to gate stages of the switches 930, respectively. Accordingly, the amplifier 920 transmits the input voltage to the load resistor 940. When the voltage is input to the amplifier 920, the switch 930 is connected so that the current ($i_L$) flowing into the driving circuit is transmitted to the laser diode 910.

The switch 930 controls whether a current will flow into the light source driving circuit 310. The switch 930 receives the voltage from the amplifier 920 through its gate stage depending on whether the voltage is applied to the light source driving circuit 310, so that the on/off of the switch is controlled.

Each voltage that is input to the light source driving circuit 310 as described above has a characteristic in which the voltage has a different size and waveform. Accordingly, the light source driving circuit 310 includes the amplifier 920, the switch 930, and the load resistor 940 each number of which is equal to or greater than the number of voltages that are input to the light source driving circuit 310.

In this case, the load resistors 940*a* to 940*n* are implemented to have different sizes depending on the sizes of (different) applied thereto so that noise and the generation of heat in the load resistor can be reduced as much as possible and an output having a predetermined level or more can also be secured through a current that is not too small. Through such a structure, a different voltage that is input to the light source driving circuit 310 is applied to one input stage of each of the amplifiers 920*a* to 920*n*. The switches 930*a* to 930*n* are connected to output stages of the amplifiers 920*a* to 920*n*, respectively. Each of the different load resistors 940*a* to 940*n* (regardless of the sizes thereof) is connected to the other input stage of each of the amplifiers 920*a* to 920*n*. Accordingly, a current corresponding to an applied voltage is generated.

As exemplified in FIG. 9, a current ($i_{L1}$) that flows along the amplifier 920*a*, the switch 930*a*, and the load resistor 940*a* to which the offset voltage ($V_{offset}$) is applied is calculated as follows.

$$i_{L1} = \frac{V_{offset}}{R_{L1}}$$

In this case, $R_{L1}$ indicates the size of the load resistor 940*a*. Likewise, a current ($i_{L2}$) that flows into the load resistor 940*b* to which the voltage ($V_{mod}$) for frequency modulation is applied and a current ($i_{L3}$) that flows into the load resistor 940*c* to which the PLL compensation voltage ($V_{pll}$) is applied are calculated as follows.

$$i_{L2} = \frac{V_{mod}}{R_{L2}}$$

$$i_{L3} = \frac{V_{pll}}{R_{L3}}$$

In this case, $R_{L2}$ and $R_{L3}$ indicate the sizes of the load resistor 940*b* and the load resistor 940*c*, respectively.

The current ($i_L$) that flows into the laser diode 910 is calculated as follows.

$$i_L = i_{L1} + i_{L2} + i_{L3}$$

In this case, the size of the load resistor 940*a* that is connected to one input stage of the amplifier 920*a* to which the offset voltage is applied is implemented to be relatively small. The size of each of the load resistors 940*b* and 940*c*, each one connected to one input stage of each of the amplifiers 920*b* and 920*c* to which the voltage for frequency modulation and the PLL compensation voltage are applied, is implemented to be relatively large. As the load resistors 940*a* to 940*n* are implemented to have different sizes depending on the sizes of voltages applied thereto, respectively, as described above, noise within a current that occurs through the load resistor 940 can be minimized, and the size of a current that flows into each load resistor can also be improved. Accordingly, the value of a current that flows into the load resistor 940 is optimized. Power that is consumed in each load resistor 940 is reduced because a current having an excessive size may not flow into any one load resistor 940. Accordingly, the amount of heat generated from the apparatus can also b reduced.

As described above, the light source and the driving circuit within the light source driving circuit 310 do not operate voltages applied thereto by summing the voltages as in a conventional technology, but generate an individual current by applying each applied voltage to each load resistor having a size that complies with the applied voltage and sum and apply the currents to the laser diode 910. Accordingly, the occurrence of noise can be minimized, and the generation of heat in the load resistor can also be minimized.

Furthermore, in FIG. 9, the offset voltage has been applied to one amplifier 920*a*, one switch 930*a*, and one load resistor 940*a*. However, the light source and the driving circuit within the light source driving circuit 310 may distribute the offset voltage having a relatively high size and separately apply the distributed offset voltages to the plurality of amplifiers 920, switches 930, and load resistors 940. Each amplifier 920, switch 930, and load resistor 940 that are separated may also be implemented to have a structure in which currents generated by the respective load resistors are added, like the remaining amplifier 920*a* to 920*n*, switches 930*a* to 930*n*, and load resistors 940*a* to 940*n*. Accordingly, all of the currents that are generated by the respective load resistors may be added and applied to the laser diode 910.

In this case, if the amplifier 920*a*, the switch 930*a*, and the load resistor 940*a* are each separated into n in number, the separated load resistors are implemented to have composite resistance that is the same as the size of the load resistor 940*a*. For example, assuming that the load resistor 940*a* has a size R, the load resistor that is separated into n in number may have a resistance value "n*R".

A problem in that the amount of heat generated is increased because a voltage (i.e., the offset voltage) having a relatively large size is applied to the load resistor can be solved, and the occurrence of noise can also be minimized.

Figure 12:
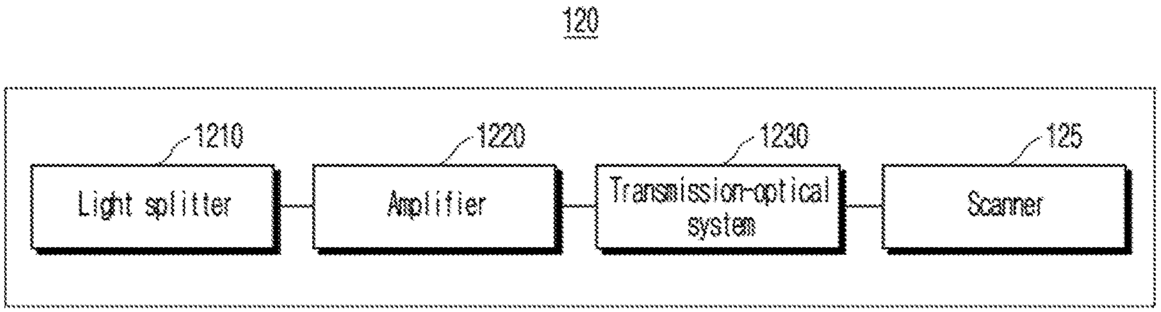
FIG. 12 is a diagram illustrating a construction of a light transmission unit according to an embodiment of the present disclosure.
Figure 13:
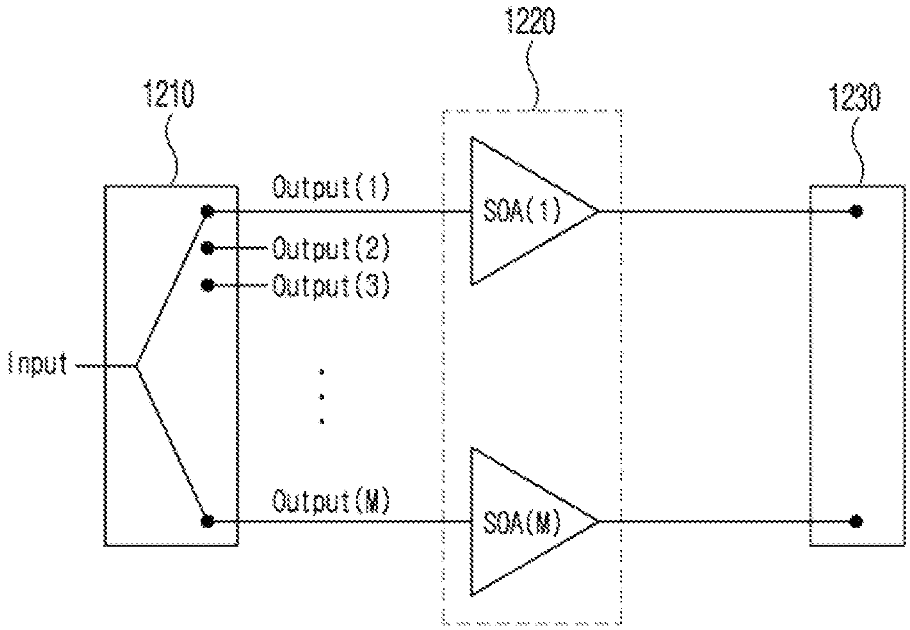
FIG. 13 is a diagram illustrating an implementation example of the light transmission unit according to an embodiment of the present disclosure.

FIG. 12 is a diagram illustrating a construction of a light transmission unit according to an embodiment of the present disclosure. FIG. 13 is a diagram illustrating an implementation example of the light transmission unit according to an embodiment of the present disclosure.

Referring to FIGS. 12 and 13, the light transmission unit 120 according to an embodiment of the present disclosure includes a light splitter 1210, an amplifier 1220, and a transmission-optical system 1230. Furthermore, the light transmission unit 120 and/or the light reception unit 130 to be described later may further include a scanner 125.

The light splitter 1210 separates light that is output by the light source unit 110 into M pieces of light. As illustrated in FIG. 13, the light splitter 1210 may be implemented as an M:1 light splitter. Accordingly, the light splitter 1210 receives light that is output by the light source unit 110 and separates the light into the M pieces of light. The light splitter 1210 inputs the pieces of separated light to the amplifier 1220.

The amplifier 1220 amplifies the light that is incident thereon. The amplifier 1220 may be implemented as a semiconductor optical amplifier (SOA). In order to remove a resonator structure from the amplifier 1220, anti-reflection processing may be applied to both sides of the SOA. Accordingly, the amplifier 1220 amplifies light by induction emission by receiving the light from the outside.

The amplifier 1220 may be implemented in the form of an SOA array. The amplifier 1220 may constitute multiple channels with a low cost by being implemented in the form of the SOA array and amplifying multi-channel light, and may also maintain a coherent characteristic of light. The amplifier 1220 may be used as a high-speed scanner because the SOA has a low price and enables high-speed switching in view of its structure.

The amplifier 1220 may simultaneously drive all the channels, and may and switch drive all the channels sequentially/non-sequentially.

The transmission-optical system 1230 receives amplified light from the amplifier 1220 and transmits the amplified light to a detection area. The transmission-optical system 1230 may be implemented as illustrated in FIG. 14.

Figure 14:
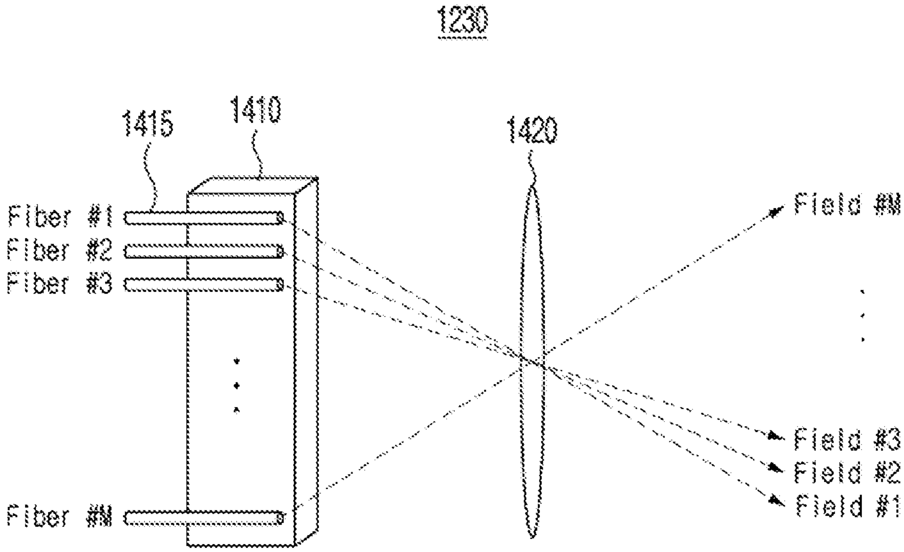
FIG. 14 is a diagram illustrating an implementation example of a transmission-optical system according to an embodiment of the present disclosure.

FIG. 14 is a diagram illustrating an implementation example of a transmission-optical system according to an embodiment of the present disclosure.

Laser light that has been amplified by the amplifier 1220 implemented in the form of the SOA array is input to an optical fiber array 1410 included in the transmission-optical system 1230. As illustrated in FIG. 14, M (the same as the number of pieces of light separated by the light splitter) optical fibers 1415 are disposed in parallel in the optical fiber array 1410 in a first direction (i.e., a direction perpendicular to a direction in which light proceeds). The M pieces of light that are output by the optical fibers 1415 within the optical fiber array 1410, respectively, may be output without any change, or may be transmitted to a detection area through other optical component 1420 that adjusts the light path of light.

If the light transmission unit 120 includes only the light splitter 1210, the amplifier 1220, and the transmission-optical system 1230, a LiDAR apparatus that scans light in the aforementioned first direction may be constructed. However, if the light transmission unit 120 further includes the scanner 125, a LiDAR apparatus that scans light in two dimensions may be constructed. The scanner 125 may scan light that is output in two dimensions by scanning the light in a second direction perpendicular to the first direction. In general, scanning in the second direction for two-dimensional scanning does not require high-speed driving because one-dimensional scanning can be driven at a very high speed in the first direction by the remaining components 1210 to 1230 of the light transmission unit 120. Accordingly, the scanner 125 that performs scanning in the second direction does not have special restrictions or requirements, and may be implemented as an arbitrary scanner.

Figure 15:
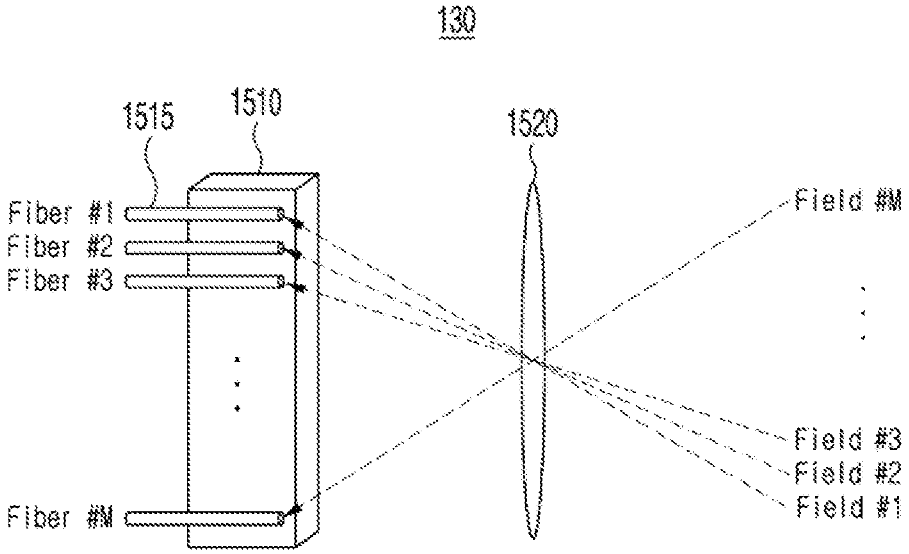
FIG. 15 is a diagram illustrating a construction of a light reception unit according to an embodiment of the present disclosure.

FIG. 15 is a diagram illustrating a construction of a light reception unit according to an embodiment of the present disclosure.

Referring to FIG. 15, the light reception unit 130 includes an optical fiber array 1510 including M optical fibers. Reflected light that is reflected by a detection area or a target is input to M optical fibers 1515 within the optical fiber array 1510. The optical fiber array 1510 is aligned on the same line of sight (LOS) as the optical fiber array 1410, and has the same structure as the optical fiber array 1410 except a transmission direction.

The light reception unit 130 may further include other optical component 1520 so that reflected light that is reflected by a detection area or a target is input to each optical fiber 1515 within the optical fiber array 1510 more smoothly.

Figure 16:
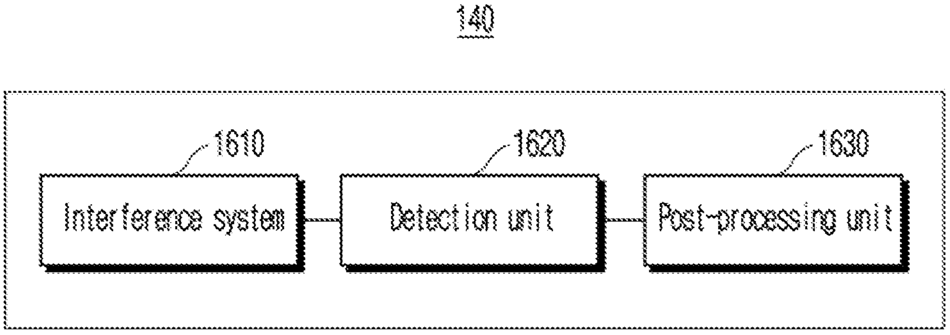
FIG. 16 is a diagram illustrating a construction of a signal processing unit according to an embodiment of the present disclosure.

FIG. 16 is a diagram illustrating a construction of a signal processing unit according to an embodiment of the present disclosure.

Referring to FIG. 16, the signal processing unit 140 according to an embodiment of the present disclosure includes an interferometer 1610, a detection unit 1620, and a post-processing unit 1630.

The interferometer 1610 may include a complex signal interferometer having a 90-degree optical hybrid structure, and may have a form in which multiple complex signal interferometers have been disposed in parallel. One implementation example of the interferometer 1610 has been illustrated in FIG. 17A or 17B.

Figure 17A:
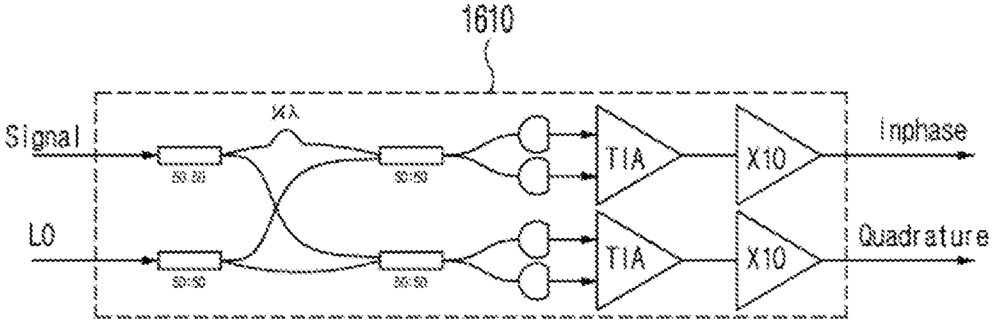
FIGS. 17A and 17B are diagrams illustrating implementation examples of an interferometer within the signal processing unit according to an embodiment of the present disclosure.
Figure 17B:
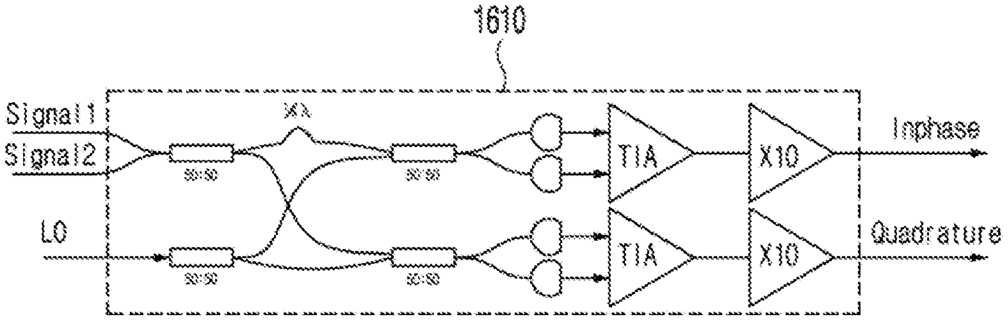

FIGS. 17A and 17B are diagrams illustrating implementation examples of an interferometer within the signal processing unit according to an embodiment of the present disclosure.

Referring to FIG. 17A, some of light that is generated by a coherent laser oscillator is branched and input to a local oscillator (LO) of the interferometer 1610. A signal (Signal) is very weak reflected light that is reflected by a target. It is very difficult to detect or impossible to detect the signal because the size of the signal is very small.

Accordingly, the interferometer 1610 makes the signal, that is, the weak reflected light, interfere with the LO, and amplifies the reflected light by an amplification effect that is generated by the interference so that the detection unit 1620 can easily detect the reflected light.

The interferometer 1610 generates an in-phase signal and a quadrature signal (i.e., a signal having a phase difference of 90 degrees from the in-phase signal) in order to generate a complex signal for the processing of a fast Fourier transform (FFT) signal and the demodulation of an amplitude modulation signal.

Referring to FIG. 17B, the interferometer 1610 may have two signal channels in order to efficiently construct a multi-channel structure. When two or more input signals are input to an interferometer simultaneously, in general, it is impossible to distinguish between the input signals because output signals are mixed. However, the interferometer 1610 may obtain input signals for two channels by using one interferometer having a 90-degree optical hybrid structure because a transmission channel for each input signal can switch in an output channel. Accordingly, costs for fabricating a reception channel can be generally reduced.

Referring back to FIG. 16, the detection unit 1620 detects reflected light (i.e., light) that has been amplified through the interferometer 1610.

The post-processing unit 1630 converts a signal that has been detected by the detection unit 1620 into a digital signal, and then obtains coordinate information of the target through post-processing.

Figure 18:
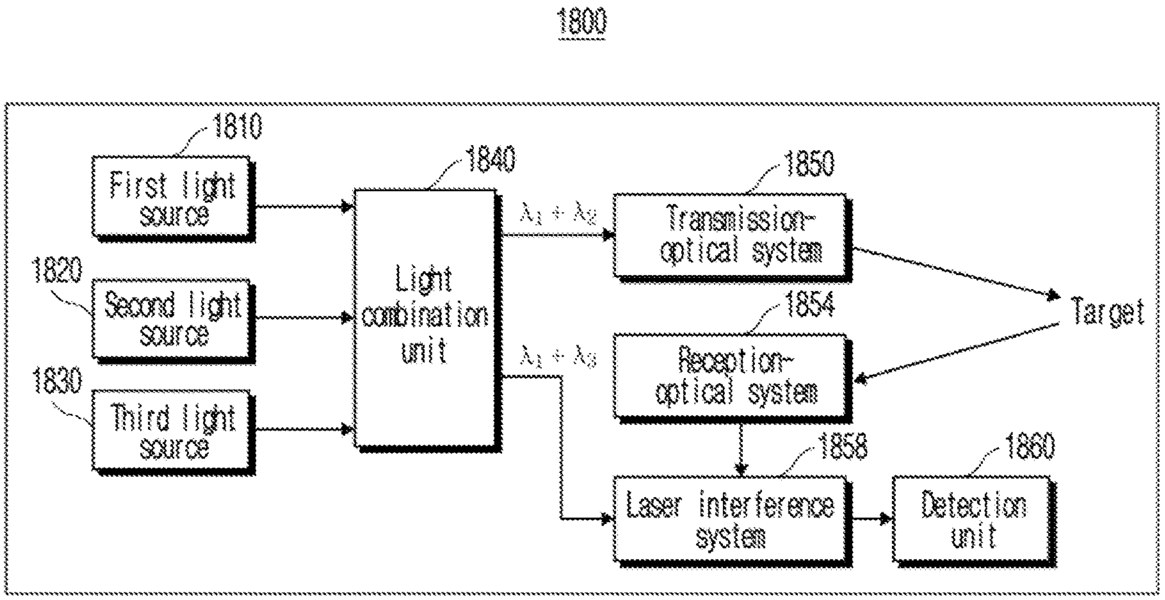
FIG. 18 is a diagram illustrating a construction of an FMCW LiDAR apparatus according to another embodiment of the present disclosure.
Figure 23:
FIG. 23 is a graph illustrating signals that are detected by the detection unit according to another embodiment of the present disclosure.

FIG. 18 is a diagram illustrating a construction of an FMCW LiDAR apparatus according to another embodiment of the present disclosure. FIG. 23 is a graph illustrating signals that are detected by the detection unit according to another embodiment of the present disclosure.

Referring to FIG. 18, an FMCW LiDAR apparatus 1800 according to an embodiment of the present disclosure includes first to third light sources 1810 to 1830, a light combination unit 1840, a transmission-optical system 1850, a reception-optical system 1854, a laser interferometer 1858, and a detection unit 1860.

The FMCW LiDAR apparatus 1800 measures a distance between the FMCW LiDAR apparatus and a target and the speed of the target by using light having a plurality of wavelengths, more specifically, light having three wavelengths. The FMCW LiDAR apparatus 1800 may measure all of the pieces of aforementioned information by only the radiation of one piece of light, and may smoothly analyze information that is included in each piece of light by distinguishing between all of the pieces of light having three wavelengths although the FMCW LiDAR apparatus includes only one detection unit.

The first to third light sources 1810 to 1830 each make light for detecting a target oscillated by receiving a current.

The light having an ideal form, which is made to oscillate by the first light source 1810, has the characteristic illustrated in FIG. 2.

Figure 20A:
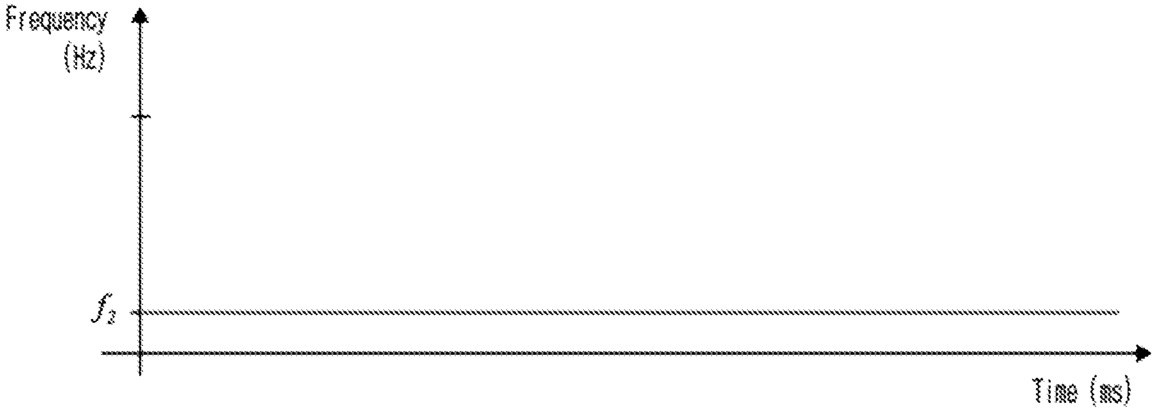
FIGS. 20A, 20B, 20C, 20D are graphs illustrating the characteristics of a change in the frequency of light for each time, which is output by each light source according to another embodiment of the present disclosure.

The second light source 1820 outputs light having a characteristic illustrated in FIG. 20A in order to detect the speed of the target.

FIG. 20A is a graph illustrating the characteristics of a change in the frequency of light for each time, which is output by the second light source, according to another embodiment of the present disclosure.

Referring to FIG. 20A, the second light source 1820 outputs light having a predetermined frequency ($f_1$) so that the speed of a target can be measured by using a Doppler effect. If a Doppler frequency of light that is reflected by the target is $f_D$, the speed of the target may be calculated as follows.

$$v = \frac{\lambda_0 \Delta f_d}{2} = \frac{\lambda_0 (f_D - f_2)}{2}$$

In this case, v means the speed of the target. $\lambda_0$ means the wavelength of the light that is output by the second light source 1820.

If the wavelength and frequency of the light radiated by the second light source 1820 and the Doppler frequency of the light reflected by the target are known through such a process, the detection unit 1860 may detect the speed of the target.

However, although the speed of the target is detected through the aforementioned process, it is difficult to check a direction in which the target moves. The target may be in a situation in which the target becomes distant at the corresponding speed or in a situation in which the target becomes close at the corresponding speed. This is conventionally detected by using AOM. However, the AOM includes various problems. For this reason, the FMCW LiDAR apparatus 1800 includes the third light source 1830. The third light source 1830 outputs light having a characteristic illustrated in FIG. 20B.

Figure 20B:
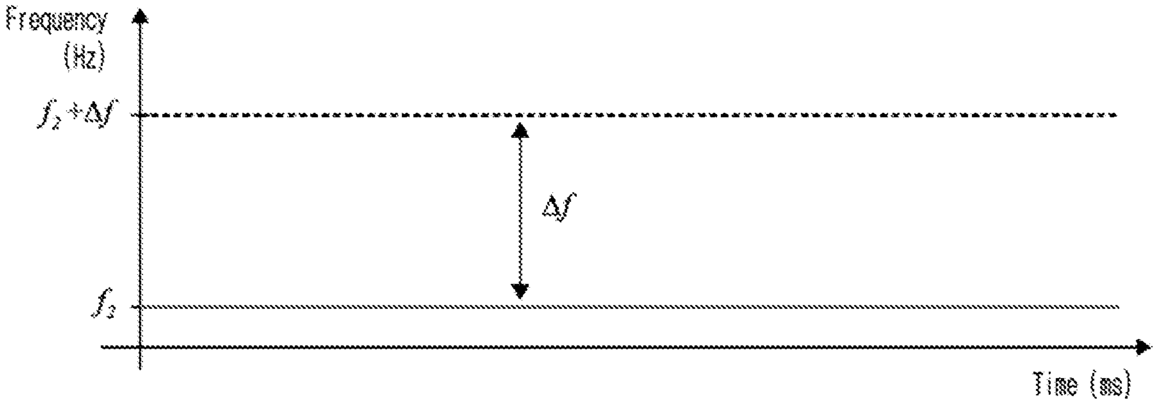

FIG. 20B is a graph illustrating the characteristics of a change in the frequency of light for each time, which is output by the third light source, according to another embodiment of the present disclosure.

Referring to FIG. 20B, the third light source 1830 outputs light having a preset frequency difference ($\Delta f$) from the frequency ($f_2$) of the light that is output by the second light source 1820. In this case, the preset frequency difference may be a frequency within a preset error range on the basis of 50 MHz. As the third light source 1830 outputs a signal having a corresponding frequency ($f_2+\Delta f$) as described above, the following effects may be obtained. If only light that is output by the second light source 1820 is present, when the detection unit 1860 detects reflected light, it may be difficult to distinguish between the frequency ($f_1$) of the light that is output by the first light source 1810 and the corresponding frequency ($f_2$). In contrast, the frequency ($f_1$) of the light that is output by the first light source 1810 and the corresponding frequency ($f_2$) can be easily distinguished because the third light source 1830 outputs the signal having the frequency ($f_2+\Delta f$) added by the preset frequency difference. Furthermore, as described above, if only the second light source 1820 outputs s light, it is difficult to detect even the directivity of a moving target. In contrast, if the third light source 1830 outputs light, even the directivity of the moving target along with a Doppler frequency that is reflected by the target can be detected as illustrated in FIGS. 20C and 20D.

Figure 20C:
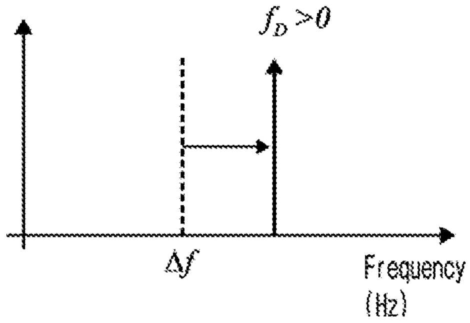
Figure 20D:
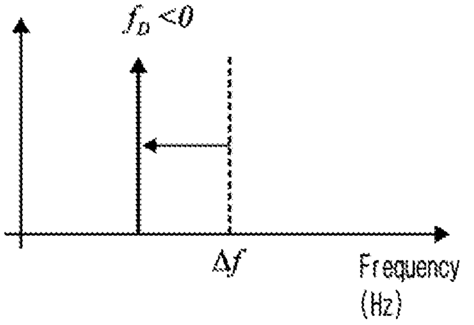

FIGS. 20C and 20D are graphs illustrating the characteristics of a change in the frequency of light for each time with respect to reflected light of light that is output by the third light source according to another embodiment of the present disclosure.

When a target becomes distant from the FMCW LiDAR apparatus 1800, a Doppler frequency ($f_D$) greater than the frequency of output light is introduced as illustrated in FIG. 20C. In contrast, when the target becomes close to the FMCW LiDAR apparatus 1800, a Doppler frequency ($f_D$) smaller than the frequency of the output light is introduced as illustrated in FIG. 20D. Referring back to FIG. 18, as the FMCW LiDAR apparatus 1800 includes even the third light source 1830, the FMCW LiDAR apparatus 1800 may detect a whole speed including the directivity of the target at a time by using one detection unit in addition to the distance between the FMCW LiDAR apparatus and the target as described above.

The light combination unit 1840 combines the pieces of light that are radiated by the light sources 1810 to 1830, respectively. The light combination unit 1840 combines and adjusts the pieces of light radiated by the first light source 1810 and the second light source 1820 so that the pieces of light are output to the outside of the FMCW LiDAR apparatus 1800, and combines and adjusts the pieces of light radiated by the first light source 1810 and the third light source 1830 so that the pieces of light proceed to the laser interferometer 1858.

The transmission-optical system 1850 adjusts the light path or state of the light that has passed through the light combination unit 1840 so that the light is radiated to the target. The transmission-optical system 1850 may amplify the light that has passed through the light combination unit 1840, and may adjust the path of the light after the amplification so that the light is output to the target.

The reception-optical system 1854 adjusts the path or state of reflected light that is reflected by the target. The reception-optical system 1854 adjusts the path of the reflected light that is reflected by the target and that is incident thereon so that the reflected light proceeds to the laser interferometer 1858.

The laser interferometer 1858 receives the reflected light that has passed through the reception-optical system 1854 and the pieces of light that have been combined in the light combination unit 1840 and that have been radiated by the first light source 1810 and the third light source 1830, respectively, and makes the pieces of light interfere with each other.

The detection unit 1860 detects information on the distance and speed of the target by receiving the light that has passed through the laser interferometer 1858. As described above, information on the distance between the target and the FMCW LiDAR apparatus 1800 may be known based on a frequency that is changed by the distance (of the reflected light). The information on the speed of the target may be known based on the Doppler frequency ($f_D$). Accordingly, the detection unit 1860 may detect the frequency that has been changed by the distance (of the reflected light) from the pieces of light that are input thereto and the Doppler frequency, and may detect the information on the distance and speed of the target therefrom.

Figure 21:
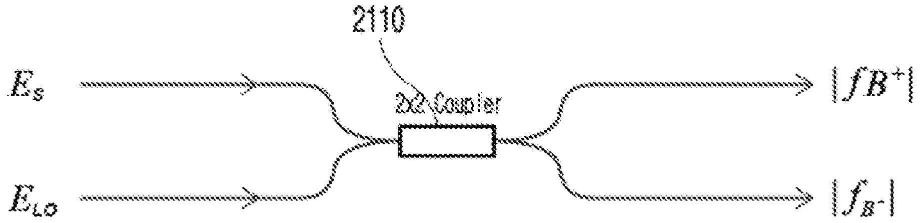
FIGS. 21 and 22 are diagrams illustrating implementation examples of a detection unit according to another embodiment of the present disclosure.

As illustrated in FIG. 21, the detection unit 1860 may include a coupler 2110 that processes only a real signal (Signal).

Figure 22:
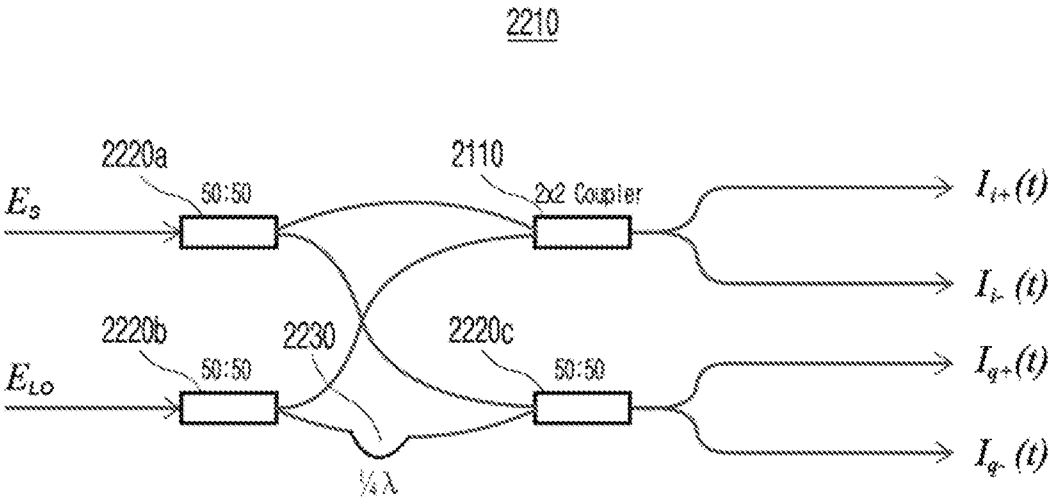

FIGS. 21 and 22 are diagrams illustrating implementation examples of the detection unit according to another embodiment of the present disclosure.

As illustrated in FIGS. 21 and 23, the coupler 2110 within the detection unit 1860 may receive reflected light ($E_S$) from the optical system 1850, and a combined signal ($E_{LO}$) of pieces of light that are radiated by the first light source and the third light source from the light combination unit 1840. The coupler 2110 receives the reflected light ($E_S$) and the combined signal ($E_{LO}$), and outputs a frequency $$(|f_B^+|)$$

of light reflected by the target in the up-chirp interval and a frequency $$(|f_B^-|)$$

of light reflected by the target in the down-chirp interval. As described above, the pieces of light radiated by the first light source 1810 and the second light source 1820 are combined and radiated to the target. Accordingly, the frequency of the target, which is included in the light reflected by the target, includes a frequency that has been changed by the distance (of the reflected light) and the Doppler frequency. Accordingly, the detection unit 1860 may detect a frequency ($f_B$) that has been changed by the distance (of the reflected light) and a Doppler frequency ($f_D$), based on the frequency that is output by the coupler 2110 (i.e., the frequency of the target).

$$f_B = \frac{|f_B^+| + |f_B^-|}{2}$$

$$f_D = \frac{|f_B^+| - |f_B^-|}{2}$$

Although the detection unit 1860 checks only an absolute value of each frequency by using the coupler 2110, the detection additionally unit 1860 may (or separately) detect the directivity of the target within the information on the speed of the target because the FMCW LiDAR apparatus 1800 includes the third light source 1830. Accordingly, although the FMCW LiDAR apparatus 1800 includes the coupler 2110, the FMCW LiDAR apparatus 1800 may wholly detect information on the distance and speed of the target.

As illustrated in FIG. 22, the detection unit 1860 may include the coupler 2210 capable of processing even a complex signal.

Referring to FIG. 22, the coupler 2210 according to an embodiment of the present disclosure includes the coupler 2110, a plurality of distributors 2220*a* to 2220*c*, and a phase delayer 2230.

The plurality of distributors 2220*a* to 2220*c* each distributes light that is incident thereon. Each of the distributors 2220*a* to 2220*c* may distribute the incident light at a ratio of 50:50.

The phase delayer 2230 is disposed in any one light path that is not connected to the coupler 2110, among light paths distributed from the distributors 2220*a* and 2220*b*, and delays the phase of light that is incident thereon. The phase delayer 2230 may delay the phase of the light by λ/4.

The coupler 2110 receives pieces of light distributed by the distributors 2220*a* and 2220*b*, respectively, and outputs the frequency $$(f_B^+)$$

of the light reflected by the target in the up-chirp interval and the frequency $$(f_B^-)$$

of the light reflected by the target in the down-chirp interval. In this case, when only the coupler 2110 is present, unlike a signal that is output by the coupler 2110, a signal that is output by the coupler 2210 includes the frequency of the target, which has a designated signal, not an absolute value. Accordingly, the detection unit 1860 may detect the frequency ($f_B$) that has been changed by the distance (of the reflected light) and the Doppler frequency ($f_D$) as follows based on the frequency (i.e., the frequency of the target) that is output by the coupler 2110.

$$f_B = \frac{f_B^+ - f_B^-}{2}$$

$$f_D = \frac{f_B^+ + f_B^-}{2}$$

According to the aforementioned process, the FMCW LiDAR apparatus 1800 may detect information on both the distance and speed of the target through one calculation process based on only a signal that is detected by the one detection unit 1860.

Figure 19:
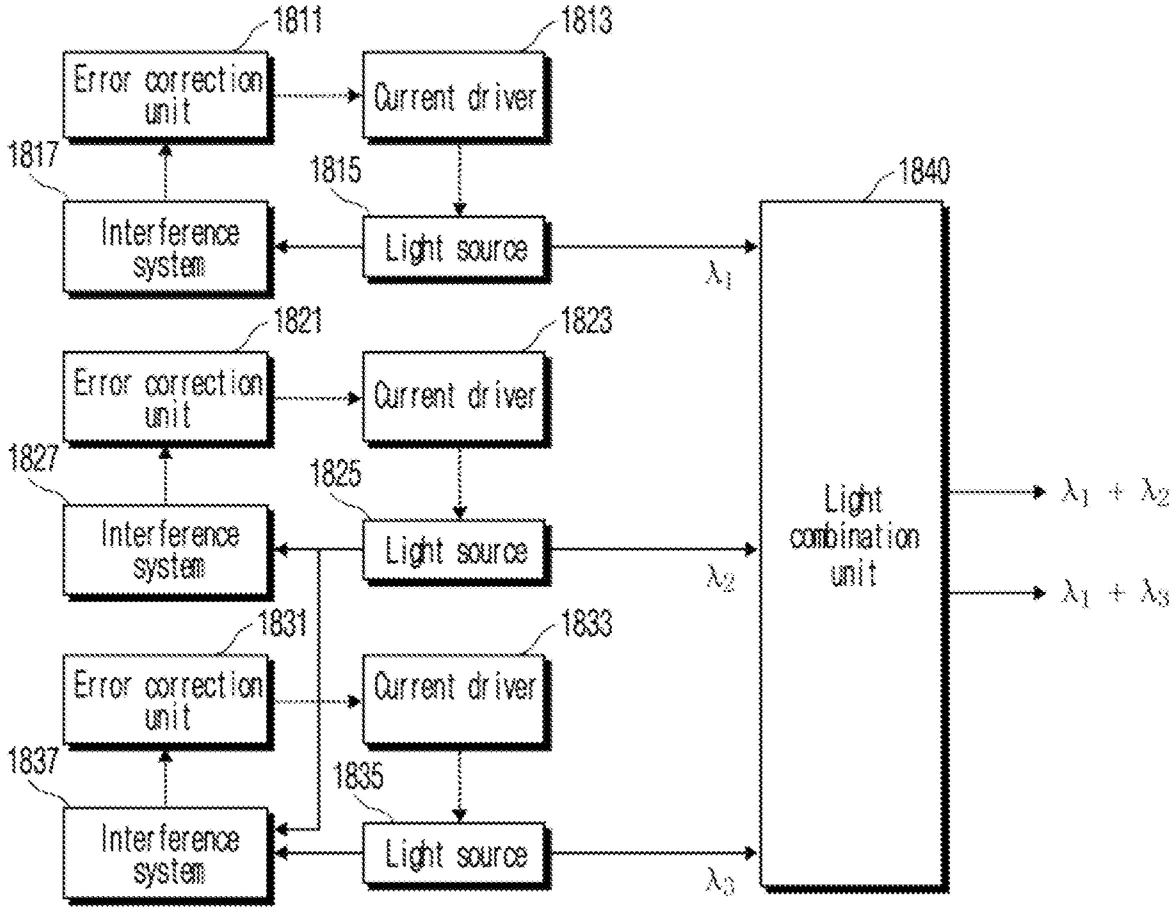
FIG. 19 is a diagram illustrating a construction of a light source and a light path adjustment unit according to another embodiment of the present disclosure.

FIG. 19 is a diagram illustrating a construction of a light source and a light path adjustment unit according to another embodiment of the present disclosure.

Referring to FIG. 19, each of the light sources 1810 to 1830 according to an embodiment of the present disclosure includes an error correction unit 1811, a current driver 1813, a light source 1815, and an interferometer 1817.

Each of the error correction units 1811, 1821, and 1831 removes phase noise included in output light so that each of the light sources 1810 to 1830 may output light having the aforementioned frequency.

Each of the current drivers 1813, 1823, and 1833 applies, to each of the light sources 1815, 1825, and 1835, a current having an error corrected by each of the error correction units 1811, 1821, and 1831. Each of the light sources 1815, 1825, and 1835 receives the current from each of the current drivers 1813, 1823, and 1833 and outputs light having the aforementioned frequency.

Each of the light sources 1815, 1825, and 1835 receives the current from each of the current drivers 1813, 1823, and 1833 and outputs light having a specific frequency.

Figure 24:
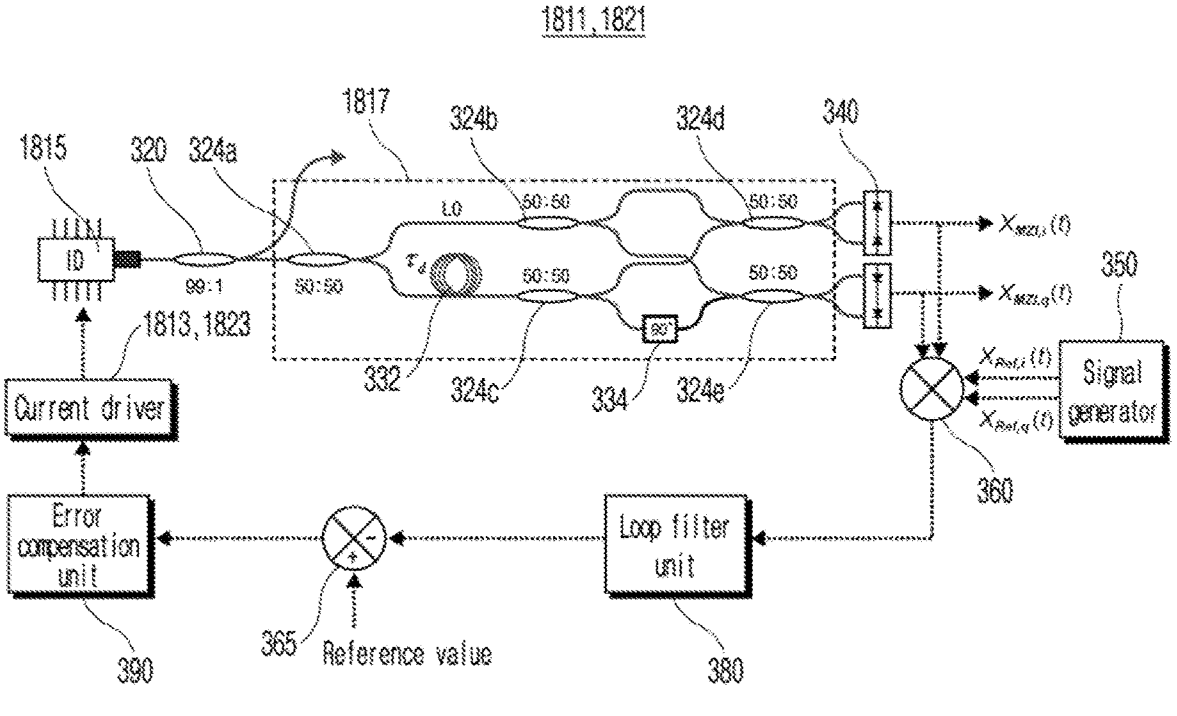
FIG. 24 is a diagram illustrating a construction of an error correction unit within a first light source according to another embodiment of the present disclosure.

The interferometer 1817 receives the light that is output by the light source 1815, and detects phase noise included in the light that is output by the light source 1815. The interferometer 1817 may be implemented as illustrated in FIG. 24. A detailed description of the interferometer 1817 is omitted.

The interferometer 1827 receives the light that is output by the light source 1825, and detects phase noise included in the light that is output by the light source 1825. The interferometer 1827 may be implemented as illustrated in FIG. 25.

Figure 25:
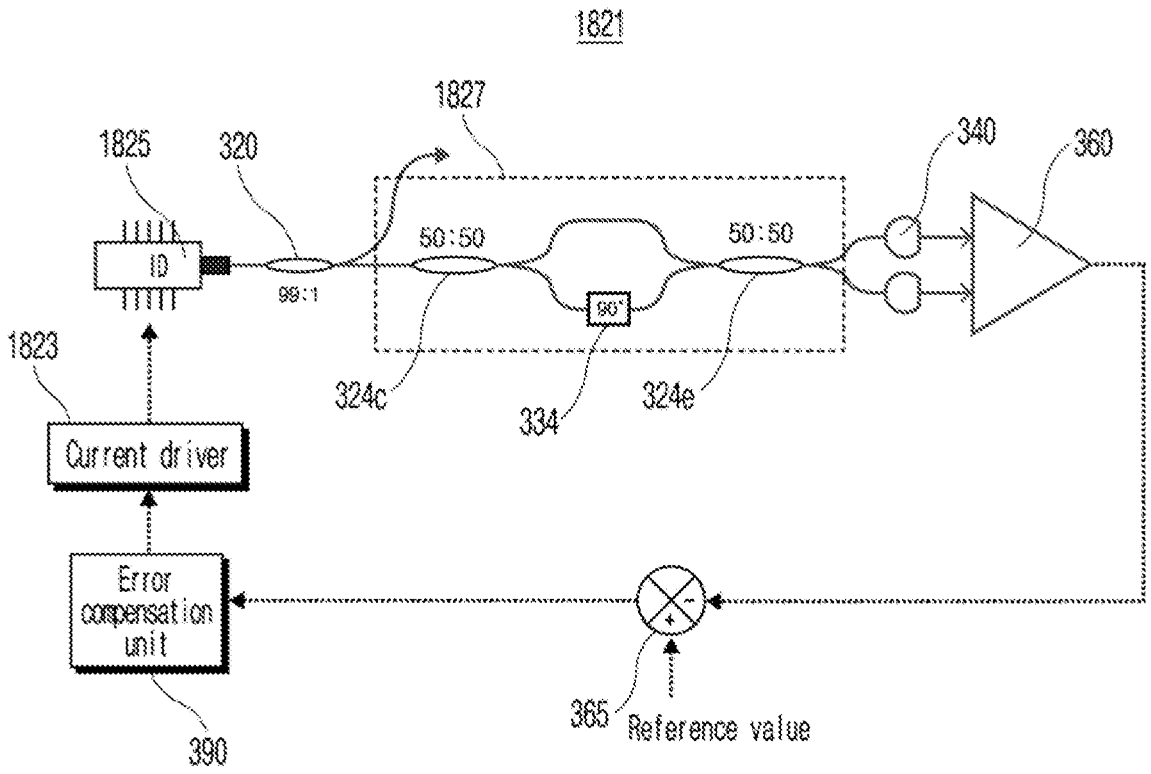
FIG. 25 is a diagram illustrating a construction of an error correction unit within a second light source according to another embodiment of the present disclosure.

FIG. 25 is a diagram illustrating a construction of the error correction unit within the second light source according to another embodiment of the present disclosure.

Referring to FIG. 25, the error correction unit 1821 according to an embodiment of the present disclosure includes distributors 320 and 324, a phase delayer 334, light reception units 340, a mixer 360, a calculator 365, and an error compensation unit 390. An operation of each of the components is the same as that of the error correction unit 1811, and thus a description of redundant contents is omitted.

The light reception unit 340 senses first interference light and second interference light as a first interference signal (a current signal) and a second interference signal (a current signal), respectively. The light reception unit 340 does not receive a reference signal from a separate signal generator because light that is output by the light source 1825 is light having a uniform frequency. Accordingly, the pieces of interference light received by the light reception unit 340 are applied to and mixed by the mixer 360.

A signal that has been mixed by the mixer 360 is applied to the calculator 365. The calculator 365 receives the mixed signal from the mixer 360 and a signal having a uniform frequency (i.e., a reference signal). The calculator 365 may output a phase noise signal that has been included in the mixed signal from the mixer 360 because the calculator 365 receives the reference signal having a uniform frequency. The calculator 365 outputs the phase noise signal to the error compensation unit 390.

The error compensation unit 390 converts the phase noise signal that has passed through the calculator 365 into a current signal so that the current driver 1823 may compensate for an error of the current signal.

The current driver 1823 applies a current having an error compensated for to the light source 1825.

The interferometer 1837 receives pieces of light that are output by the light source 1825 and the light source 1835, and detects whether a frequency difference between the two pieces of light is constant. The interferometer 1837 may be implemented as illustrated in FIG. 26.

Figure 26:
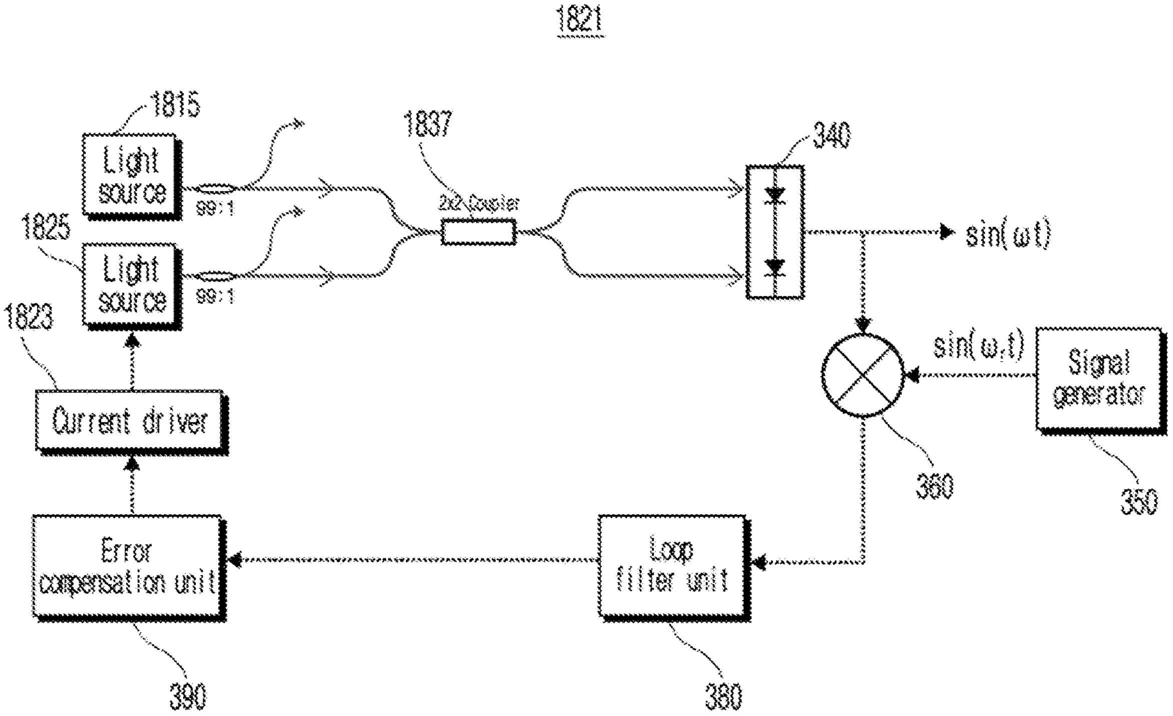
FIG. 26 is a diagram illustrating a construction of an error correction unit within a third light source according to another embodiment of the present disclosure.

FIG. 26 is a diagram illustrating a construction of the error correction unit within the third light source according to another embodiment of the present disclosure.

Referring to FIG. 26, the error correction unit 1831 according to another embodiment of the present disclosure includes a light reception unit 340, a signal generator 350, a mixer 360, a loop filter unit 380, and an error compensation unit 390. An operation of each of the components is the same as that of the error correction unit 1811, and thus a description of redundant contents is omitted.

The interferometer 1837 is implemented as a component capable of comparing the frequencies of both signals applied thereto, such as a 2×2 coupler, receives pieces of light that are output by the light sources 1825 and 1835, and makes the pieces of light interfere with each other.

The signal generator 350 generates a reference signal having a frequency corresponding to the preset frequency difference ($\Delta f$) that needs to be owned by the light sources 1825 and 1835.

The mixer 360 receives and mixes interference light received by the light reception unit 340 and the reference signal generated by the signal generator 350.

The loop filter unit 380 receives a signal that has been mixed by the mixer 360 and filters out other noise from the signal.

The error compensation unit 390 converts a phase noise signal that has passed through the loop filter unit 380 into a current signal, and applies a current having an error compensated for to the current driver 1833. Accordingly, the current driver 1833 may maintain a preset frequency difference between the frequency of light that is output by the light source 1835 and the frequency of light that is output by the light source 1825.

The above description is merely a description of the technical spirit of the present embodiment, and those skilled in the art may change and modify the present embodiment in various ways without departing from the essential characteristic of the present embodiment. Accordingly, the embodiments should not be construed as limiting the technical spirit of the present embodiment, but should be construed as describing the technical spirit of the present embodiment. The technical spirit of the present embodiment is not restricted by the embodiments. The range of protection of the present embodiment should be construed based on the following claims, and all of technical spirits within an equivalent range of the present embodiment should be construed as being included in the scope of rights of the present embodiment.

What is claimed is:

1. A LiDAR apparatus comprising:

a first light source configured to output light for detecting a distance up to a target, the light having a frequency that linearly changes between a first frequency and a second frequency over time;

a second light source configured to output light having a preset frequency for detecting a speed of the target;

a third light source configured to output light having a preset frequency difference from the preset frequency of the light output by the second light source for detecting a directivity of the target that moves;

a light combination unit configured to combine pieces of light radiated by the first to third light sources, respectively;

an optical system configured to adjust a path or state of light to be output to an outside or reflected light that is reflected by the target;

an interferometer configured to receive the light that has been combined by the light combination unit and the reflected light that has passed through the optical system and to make the combined light and the reflected light interfere with each other; and a detection unit configured to detect information on a distance and speed including directivity of the target by receiving the light subjected to the interference in the interferometer, wherein the light combination unit combines and adjusts the pieces of light radiated by the first light source and the second light source and outputs a first set of combined and adjusted pieces of light radiated by the first light source and the second light source to the outside of the LiDAR apparatus, and wherein the light combination unit combines and adjusts the pieces of light radiated by the first light source and the third light source and outputs a second set of combined and adjusted pieces of light radiated by the first light source and the third light source to the interferometer.

2. The LiDAR apparatus of claim 1, wherein the optical system comprises:

a transmission-optical system configured to adjust a path of the light combined by the light combination unit so that the light proceeds to the target; and a reception-optical system configured to adjust a path of the reflected light that is incident thereon from the outside by being reflected by the target so that the reflected light proceeds to the interferometer.

3. The LiDAR apparatus of claim 1, wherein the optical system amplifies light that is combined by the light combination unit and that is to be output to the target.

4. The LiDAR apparatus of claim 1, wherein the detection unit detects the information on the distance of the target based on a frequency that has been changed by the distance of the reflected light.

5. The LiDAR apparatus of claim 1, wherein the detection unit detects the information on the speed of the target based on a Doppler frequency.

* * * * *